United States Patent
Yang et al.

(10) Patent No.: US 10,327,258 B2
(45) Date of Patent: Jun. 18, 2019

(54) METHOD AND USER EQUIPMENT FOR RECEIVING DOWNLINK CONTROL INFORMATION, AND METHOD AND BASE STATION FOR TRANSMITTING DOWNLINK CONTROL INFORMATION

(71) Applicant: LG ELECTRONICS INC., Seoul (KR)

(72) Inventors: Suckchel Yang, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/328,467

(22) PCT Filed: Jul. 28, 2015

(86) PCT No.: PCT/KR2015/007897
§ 371 (c)(1),
(2) Date: Jan. 23, 2017

(87) PCT Pub. No.: WO2016/018056
PCT Pub. Date: Feb. 4, 2016

(65) Prior Publication Data
US 2017/0215202 A1    Jul. 27, 2017

Related U.S. Application Data

(60) Provisional application No. 62/029,580, filed on Jul. 28, 2014, provisional application No. 62/094,050, (Continued)

(51) Int. Cl.
*H04W 72/12* (2009.01)
*H04L 5/00* (2006.01)
(Continued)

(52) U.S. Cl.
CPC ....... *H04W 72/1278* (2013.01); *H04L 5/0048* (2013.01); *H04L 5/0055* (2013.01);
(Continued)

(58) Field of Classification Search
None
See application file for complete search history.

(56) References Cited

U.S. PATENT DOCUMENTS

2014/0098774 A1    4/2014  Gao et al.
2014/0269452 A1*   9/2014  Papasakellariou ... H04B 7/2643
                                                           370/280
(Continued)

FOREIGN PATENT DOCUMENTS

KR    1020140093222    7/2014
WO       2012141513   10/2012
WO       2013006006    1/2013

OTHER PUBLICATIONS

PCT International Application No. PCT/KR2015/007897, Written Opinion of the International Searching Authority dated Nov. 23, 2015, 25 pages.
(Continued)

*Primary Examiner* — Donald L Mills
(74) *Attorney, Agent, or Firm* — Lee, Hong, Degerman, Kang & Waimey

(57) ABSTRACT

Provided are a method and an apparatus for transmitting/receiving scheduling information for one cell (a particular cell) from among a plurality of cells under a carrier aggregation condition in which a plurality of cells are aggregated. One embodiment according to the present invention transmits/receives a downlink grant for the particular cell from a first cell from among the plurality of cells, and transmits/receives an uplink grant for the particular cell from a second cell, from among the plurality of cells, which is different from the first cell. The particular cell may be a different cell
(Continued)

from the first and second cells, or may be the same cell as the first cell or the second cell.

22 Claims, 16 Drawing Sheets

Related U.S. Application Data filed on Dec. 18, 2014, provisional application No. 62/132,522, filed on Mar. 13, 2015, provisional application No. 62/144,351, filed on Apr. 8, 2015.

(51) Int. Cl.
*H04W 16/14* (2009.01)
*H04W 72/04* (2009.01)
*H04W 88/02* (2009.01)
*H04W 88/08* (2009.01)

(52) U.S. Cl.
CPC ......... *H04W 16/14* (2013.01); *H04W 72/042* (2013.01); *H04L 5/001* (2013.01); *H04W 88/02* (2013.01); *H04W 88/08* (2013.01)

(56) References Cited

U.S. PATENT DOCUMENTS

| | | | |
|---|---|---|---|
| 2014/0293893 A1* | 10/2014 | Papasakellariou | H04W 72/04 370/329 |
| 2015/0365925 A1* | 12/2015 | Fu | H04W 24/10 370/329 |
| 2017/0094528 A1* | 3/2017 | Takeda | H04W 16/14 |
| 2017/0094681 A1* | 3/2017 | Takeda | H04W 16/14 |
| 2017/0215205 A1* | 7/2017 | Takeda | H04W 74/0816 |

OTHER PUBLICATIONS

ZTE, "Scheduling and HARQ timing for cross-carrier Pusch scheduling for TDD CA with different UL-DL configurations", R1-123389, 3GPP TSG RAN WG1 Meeting #70, Aug. 2012, 8 pages.

* cited by examiner $p$ : CRS for antenna port p ($p \in 0$, $p \in 0,1$ or $p \in 0,1,2,3$)

(a)

(b)

(a)

(b)

PUCCH format 1a and 1b structure (normal CP case)

METHOD AND USER EQUIPMENT FOR RECEIVING DOWNLINK CONTROL INFORMATION, AND METHOD AND BASE STATION FOR TRANSMITTING DOWNLINK CONTROL INFORMATION

CROSS-REFERENCE TO RELATED APPLICATIONS

This application is the National Stage filing under 35 U.S.C. 371 of International Application No. PCT/KR2015/007897, filed on Jul. 28, 2015, which claims the benefit of U.S. Provisional Application No. 62/029,580, filed on Jul. 28, 2014, 62/094,050, filed on Dec. 18, 2014, 62/132,522, filed on Mar. 13, 2015, and 62/144,351, filed on Apr. 8, 2015, the contents of which are all hereby incorporated by reference herein in their entirety.

TECHNICAL FIELD

The present invention relates to a wireless communication system and, more particularly, to a method of transmitting or receiving downlink control information and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method of receiving control information by a user equipment (UE) for which a plurality of cells is configured, comprising: receiving first control information about a physical downlink shared channel (PDSCH) allocated to a first cell among the plural cells on one (hereinafter, a downlink scheduling cell) of the plural cells and receiving downlink data through the PDSCH on the first cell based on the first control information. The method may include receiving second control information about a physical uplink shared channel (PUSCH) allocated to the first cell among the plural cells on a cell (hereinafter, an uplink scheduling cell) other than the downlink scheduling cell among the plural cells and transmitting uplink data through the PUSCH on the first cell based on the second control information.

In another aspect of the present invention, provided herein is a user equipment (UE) for receiving control information, for which a plurality of cells is configured, comprising: a radio frequency (RF) unit and a processor configured to control the RF unit. The processor may be configured to control the RF unit to receive first control information about a physical downlink shared channel (PDSCH) allocated to a first cell among the plural cells on one (hereinafter, a downlink scheduling cell) of the plural cells and control the RF unit to receive downlink data through the PDSCH on the first cell based on the first control information. The processor may be configured to control the RF unit to receive second control information about a physical uplink shared channel (PUSCH) allocated to the first cell among the plural cells on a cell (hereinafter, an uplink scheduling cell) other than the downlink scheduling cell among the plural cells and control the RF unit to transmit uplink data through the PUSCH on the first cell based on the second control information.

In another aspect of the present invention, provided herein is a method of transmitting control information by a base station (BS) for which a plurality of cells is configured, comprising: transmitting first control information about a physical downlink shared channel (PDSCH) allocated to a first cell among the plural cells to a user equipment (UE) on one (hereinafter, a downlink scheduling cell) of the plural cells and transmitting downlink data to the UE through the PDSCH on the first cell based on the first control information. The method may include transmitting second control information about a physical uplink shared channel (PUSCH) allocated to the first cell among the plural cells to the UE on a cell (hereinafter, an uplink scheduling cell) other than the downlink scheduling cell among the plural cells and receiving uplink data from the UE through the PUSCH on the first cell based on the second control information.

In another aspect of the present invention, provided herein is a base station (BS) for transmitting control information, for which a plurality of cells is configured, comprising: a radio frequency (RF) unit and a processor configured to control the RF unit. The processor may be configured to control the RF unit to transmit first control information about a physical downlink shared channel (PDSCH) allocated to a first cell among the plural cells to a user equipment (UE) on one (hereinafter, a downlink scheduling cell) of the plural cells and control the RF unit to transmit downlink data to the UE through the PDSCH on the first cell based on the first control information. The processor may be configured to control the RF unit to transmit second control information about a physical uplink shared channel (PUSCH) allocated to the first cell among the plural cells to the UE on a cell (hereinafter, an uplink scheduling cell) other than the downlink scheduling cell among the plural cells and control the RF unit to receive uplink data from the UE through the PUSCH on the first cell based on the second control information.

In each aspect of the present invention, the plural cells may include one or more first type cells on which a reference signal used for channel measurement of a corresponding cell is periodically received.

In each aspect of the present invention, the plural cells may include one or more second type cells on which the reference signal used for channel measurement is aperiodically received.

In each aspect of the present invention, the uplink scheduling cell may be a cell different from the first cell.

In each aspect of the present invention, the uplink scheduling cell may be a cell other than the second type cell.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a new carrier which is not dedicated to a legacy system while maintaining compatibility with the legacy system can be aggregated with a carrier of the legacy system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
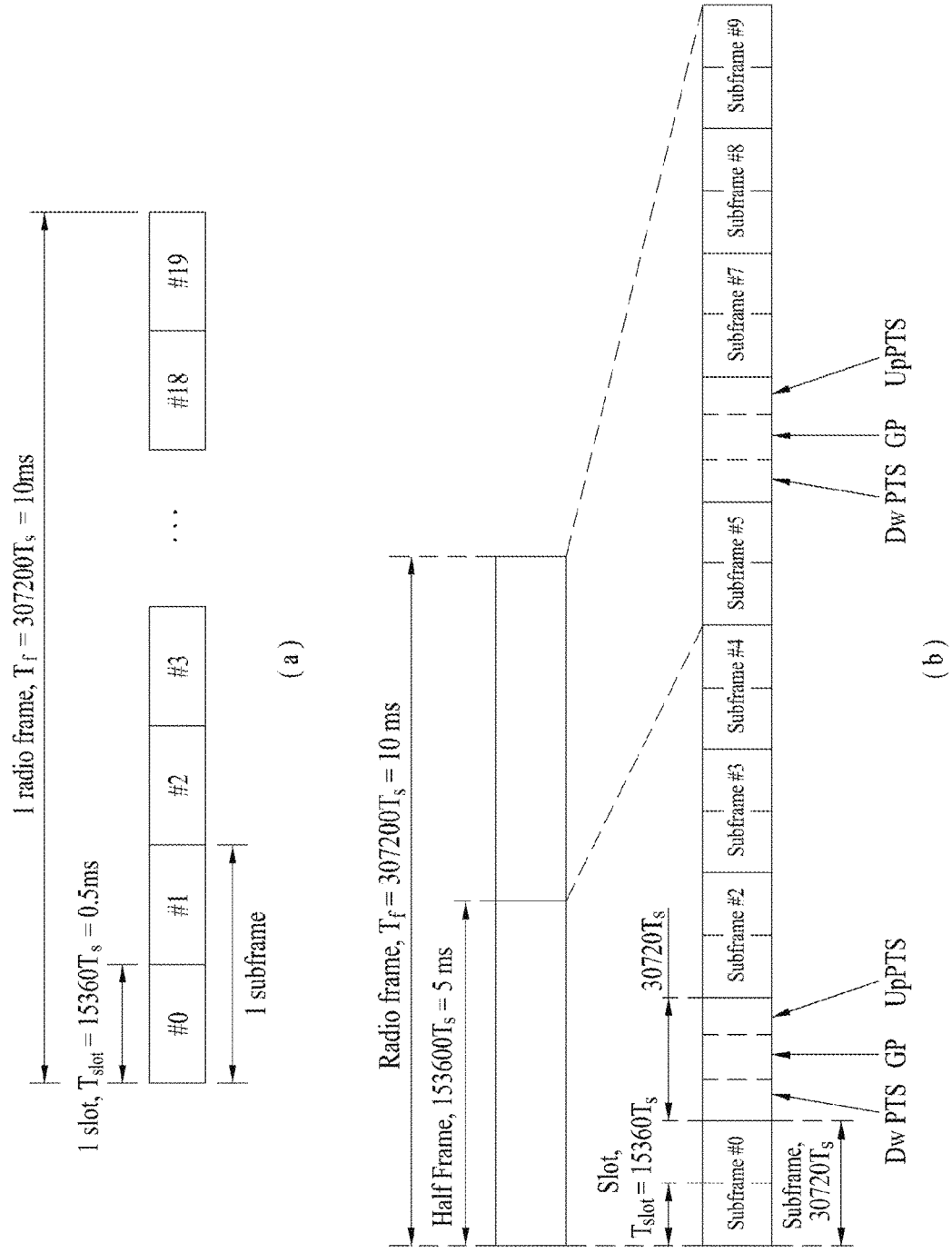
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
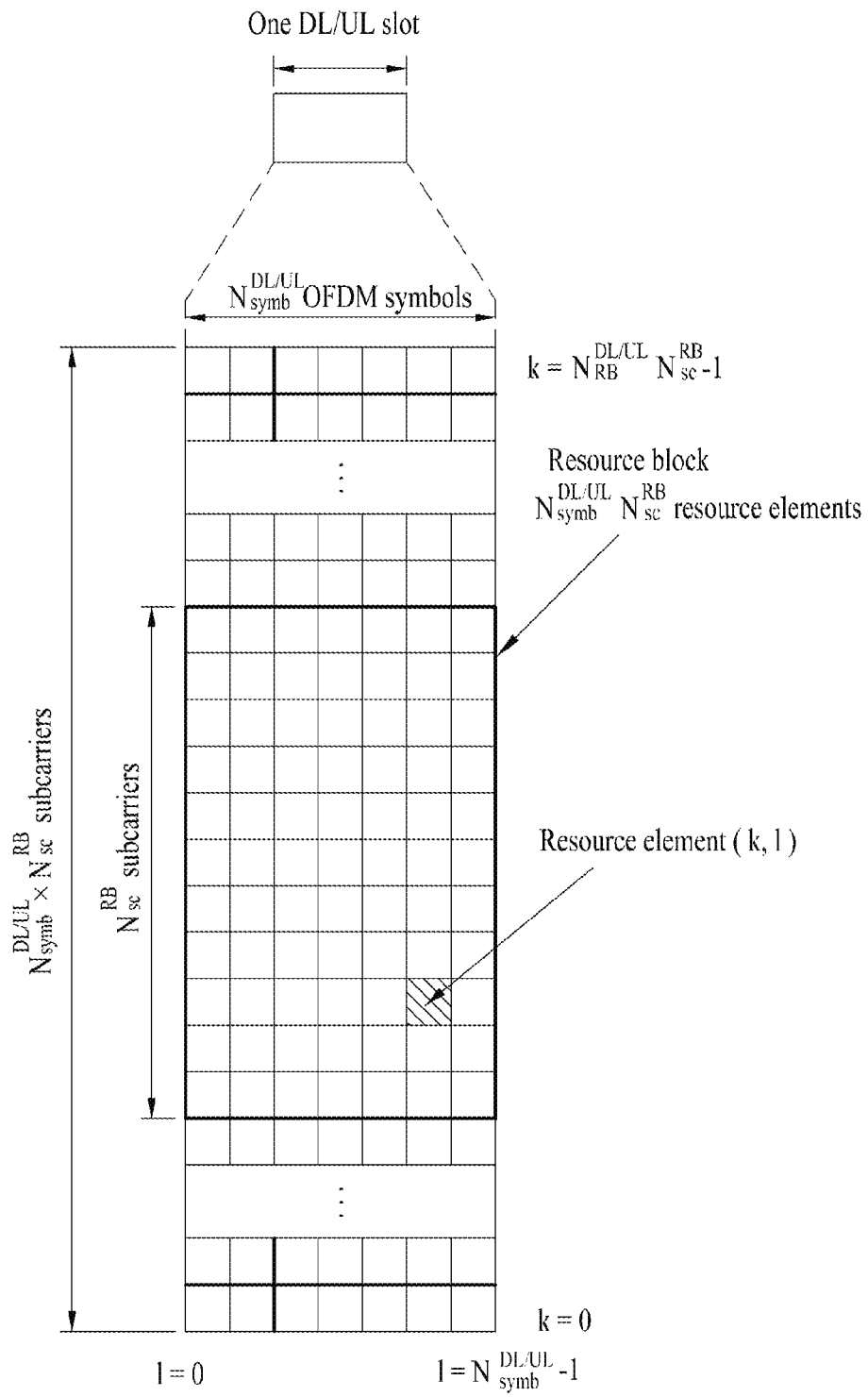
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_e$.

One RB is defined as $N^{DU/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
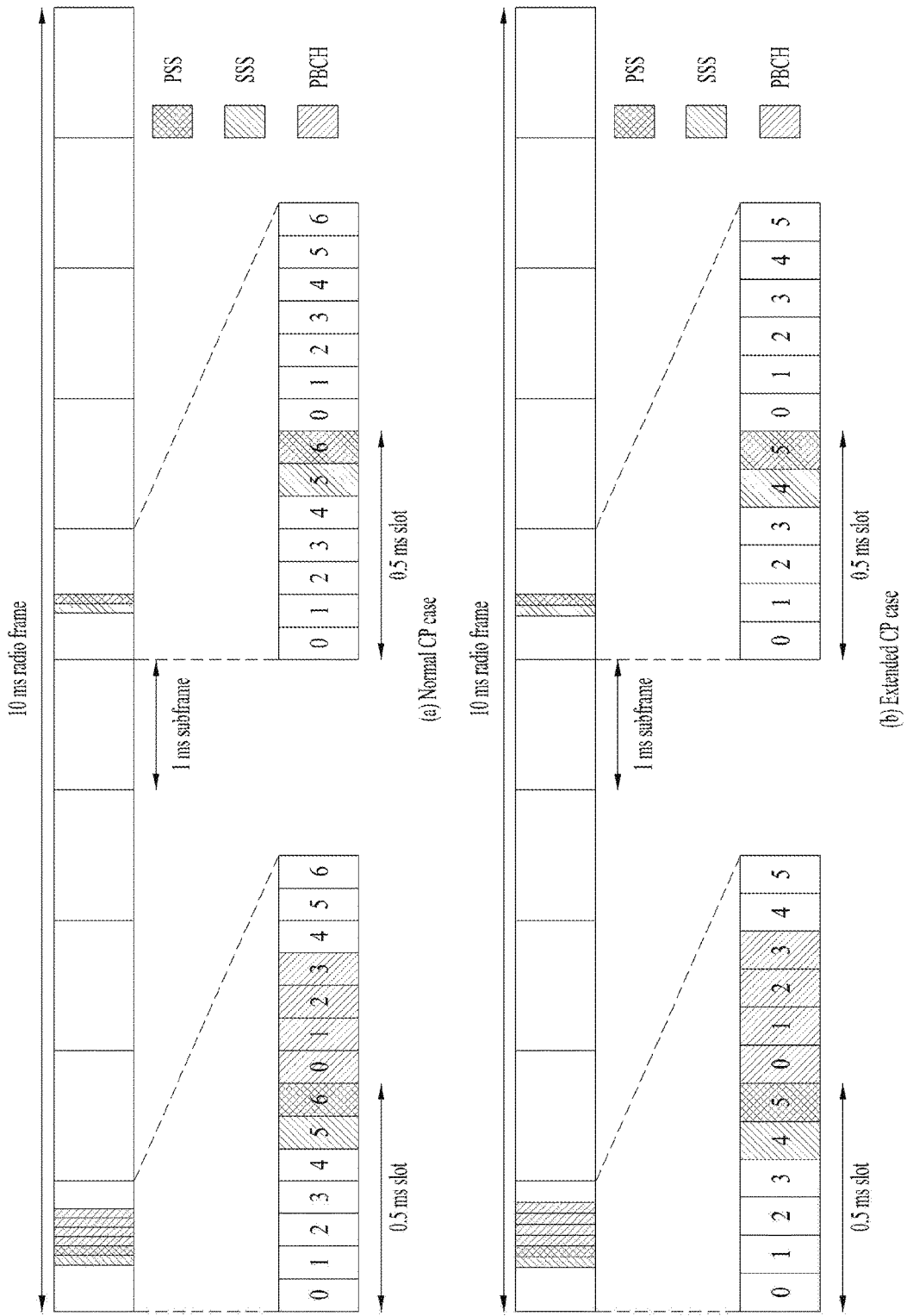
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. After performing the aforementioned procedure, the UE may perform PDDCH/PDSCH reception and PUSCH/PUCCH transmission as general uplink/downlink transmission procedures.

Figure 4:
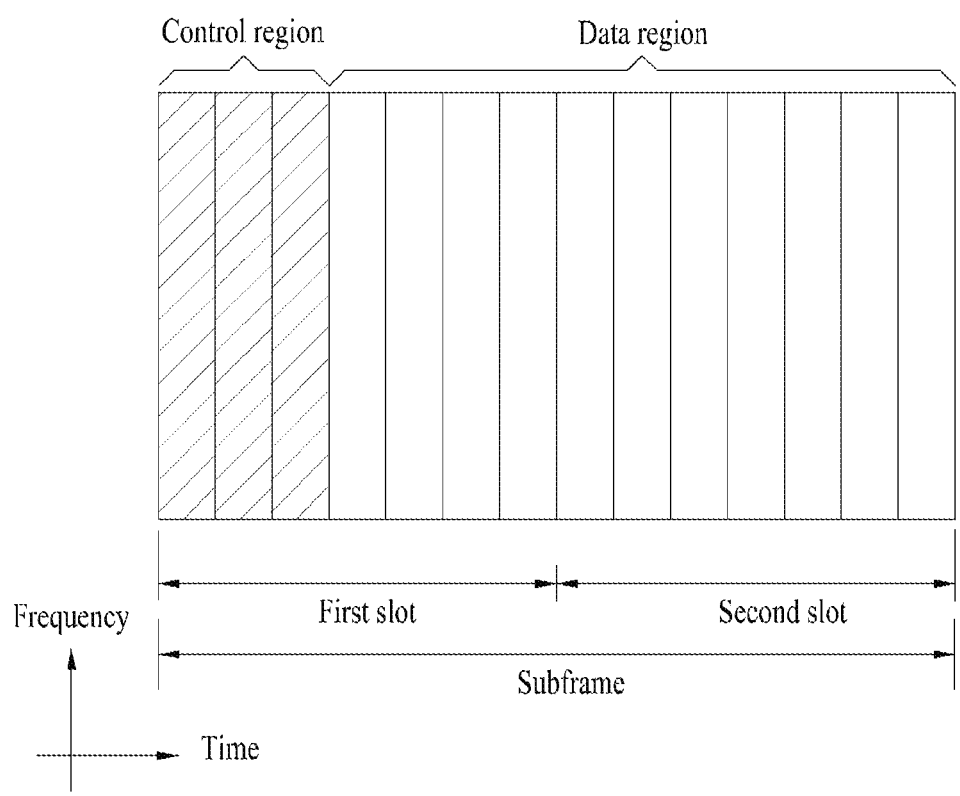
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

If RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH. Hereinafter, a PDCCH and an EPDCCH are simply referred to as PDCCHs except in cases specific to the EPDCCH. The present invention may be applied to an EPDCCH, a PUSCH, and a PDSCH and/or a PUSCH scheduled by the EPDCCH as well as to a PDCCH, a PUCCH, and a PDSCH and/or a PUSCH scheduled by the PDCCH.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the UE.

In order for the UE to demodulate or decode a DL signal, an RS signal is needed to estimate a channel between the UE and a node which has transmitted the DL signal. A CRS defined in an LTE system may be used for both demodulation and measurement. A DRS is known only to a specific RS and the CRS is known to all UEs. The CRS defined in the 3GPP LTE system may be regarded as a type of common RS. For reference, since demodulation is a part of a decoding process, the term demodulation is used interchangeably with the term decoding in the present invention.

Figure 5:
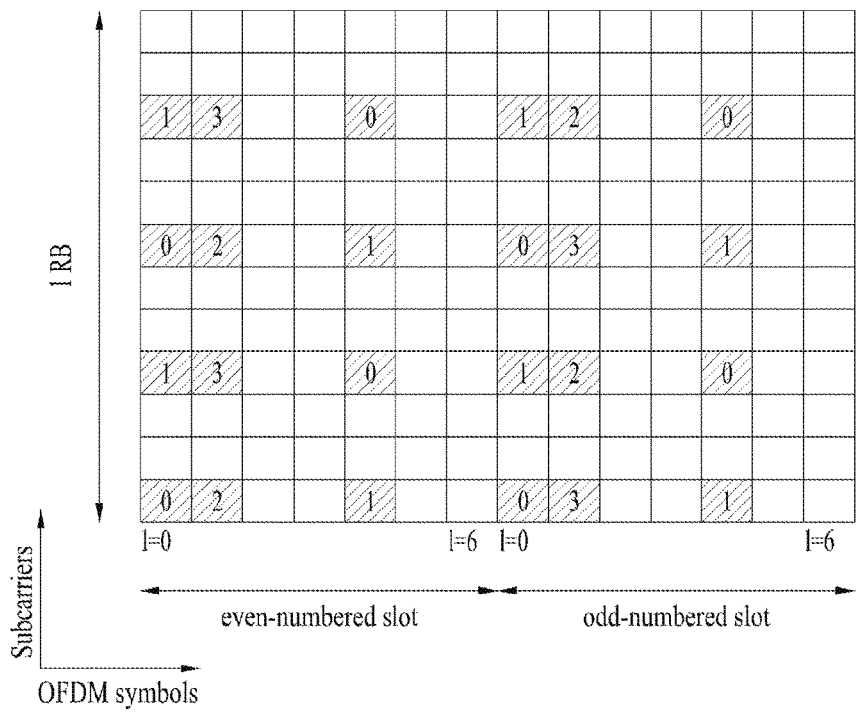
FIG. 5 illustrates configuration of cell specific reference signals (CRSs).

FIG. 5 illustrates configuration of cell specific reference signals (CRSs). Especially, FIG. 5 illustrates configuration of CRSs for a 3GPP LTE system supporting a maximum of four antennas.

In a legacy 3GPP system, since a CRS is used for both demodulation and measurement, the CRS is transmitted over an entire DL bandwidth in all DL subframes in a cell supporting PDSCH transmission and is transmitted over all antenna ports configured at an eNB.

The UE may measure CSI using a CRS and demodulate a signal received on a PDSCH in a subframe including the CRS by using the CRS. That is, the eNB transmits the CRS at a predetermined location in each of all RBs and the UE performs channel estimation based on the CRS and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRS, since the eNB should transmit the CRS in all RBs, unnecessary RS overhead occurs. To solve such a problem, in a 3GPP LTE-A system, a UE-specific RS (hereinafter, UE-RS) and a CSI-RS are further defined in addition to the CRS. The UE-RS is used to perform demodulation and the CSI-RS is used to derive CSI. The UE-RS is a kind of a DRS. The UE-RS and the CRS may be demodulation RSs in terms of usage because both signals are used for demodulation. The CSI-RS and the CRS may be measurement RSs in terms of usage because both signals are used for channel measurement or channel estimation.

Figure 6:
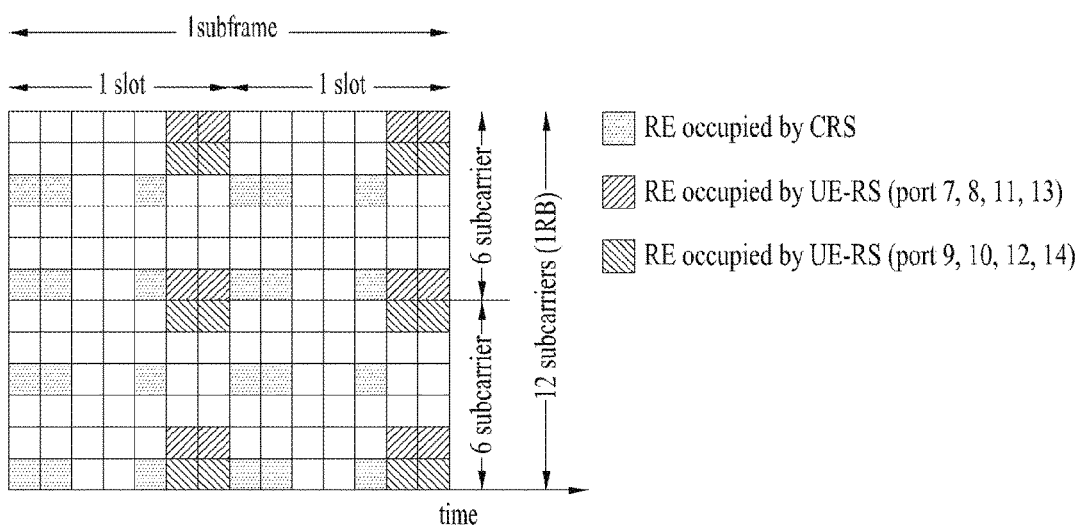
FIG. 6 illustrates UE-specific reference signals (UE-RSs).

FIG. 6 illustrates UE-specific reference signals (UE-RSs). In more detail, FIG. 6 illustrates REs occupied by UE-RSs among REs in one RB of a normal DL subframe with a normal CP.

UE-RSs are transmitted on antenna port(s) p=5, p=7, p=8 or p=7, 8, ..., υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. In addition, the UE-RS is transmitted only on antenna port(s) corresponding respectively to layer(s) of the PDSCH, unlike the CRS transmitted on all antenna port(s) regardless of the number of layers of the PDSCH. Accordingly, the UE-RS can reduce RS overhead relative to the CRS.

Figure 7:
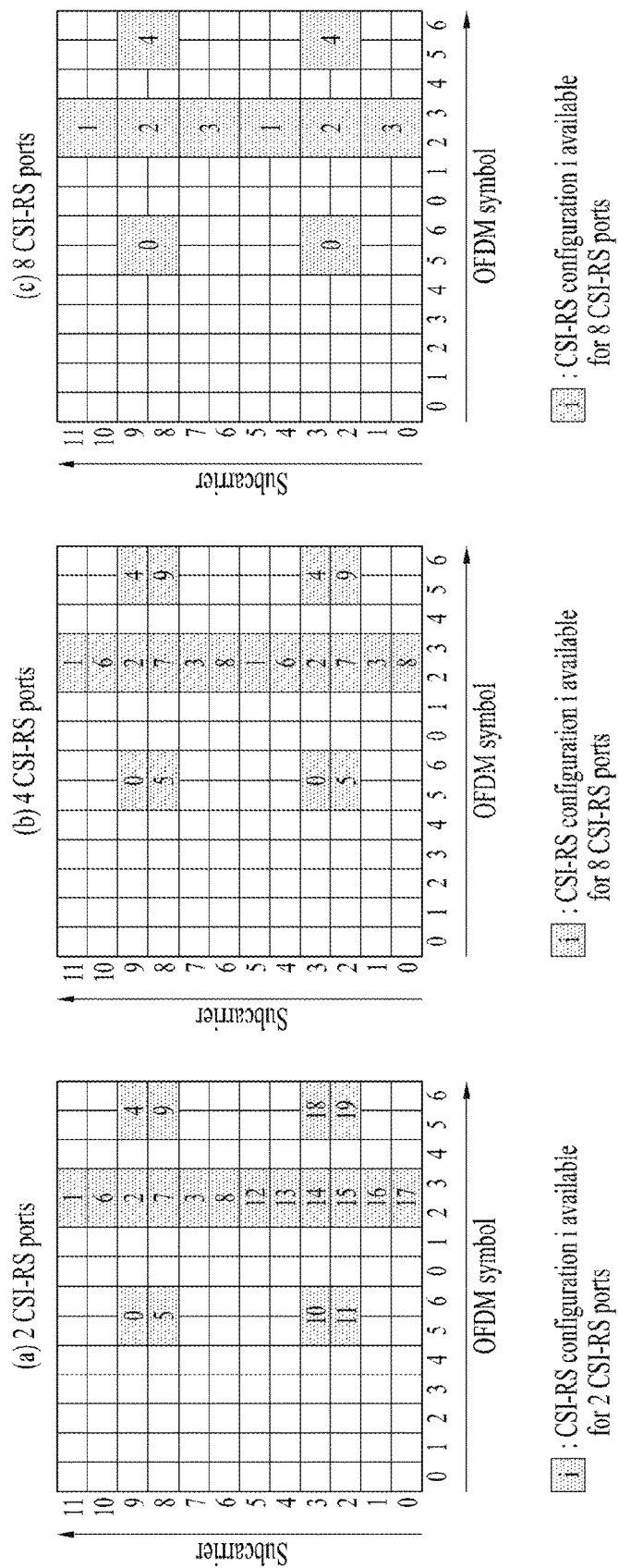
FIG. 7 illustrates channel state information reference signal (CSI-RS) configurations.

FIG. 7 illustrates channel state information reference signal (CSI-RS) configurations.

The CSI-RS is a DL RS introduced in the 3GPP LTE-A system, not for demodulation but for channel measurement. In the 3GPP LTE-A system, a plurality of CSI-RS configurations is defined for CSI-RS transmission.

FIG. 7(a) illustrates 20 CSI-RS configurations 0 to 19 available for CSI-RS transmission through two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, referring to Equation 25, antenna ports 15 to 22 correspond to the CSI-RS ports. Since CSI-RS configuration differs according to the number of CSI-RS ports, if the numbers of antenna ports configured for CSI-RS transmission differ, even the same CSI-RS configuration number corresponds to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair but also with subframes in which CSI-RSs are configured. That is, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number is assigned and a CSI-RS configuration varying according to a CSI-RS configuration number, the number of CSI-RS ports, and/or a CSI-RS configured subframe, the CSI-RS configuration of the latter will be referred to as a CSI-RS resource configuration.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc. CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table illustrates frame configuration $I_{CSI-RS}$ according to $T_{CSI-RS}$ and $\Delta_{CSI-RS}$.

TABLE 3

| CSI-RS SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying "$(10n_f+\text{floor}(n_s/2)-\Delta_{CSI-RS}) \mod T_{CSI-RS}=0$" are subframes including a CSI-RS. Here, $n_f$ denotes a radio frame number in a radio frame and $n_s$ denotes a slot number in a radio frame.

A UE configured as transmission mode defined after the 3GPP LTE-A system (e.g. transmission mode 9 or other newly defined transmission mode) may perform channel measurement using a CSI-RS and demodulate or decode a PDSCH using the UE-RS.

Figure 8:
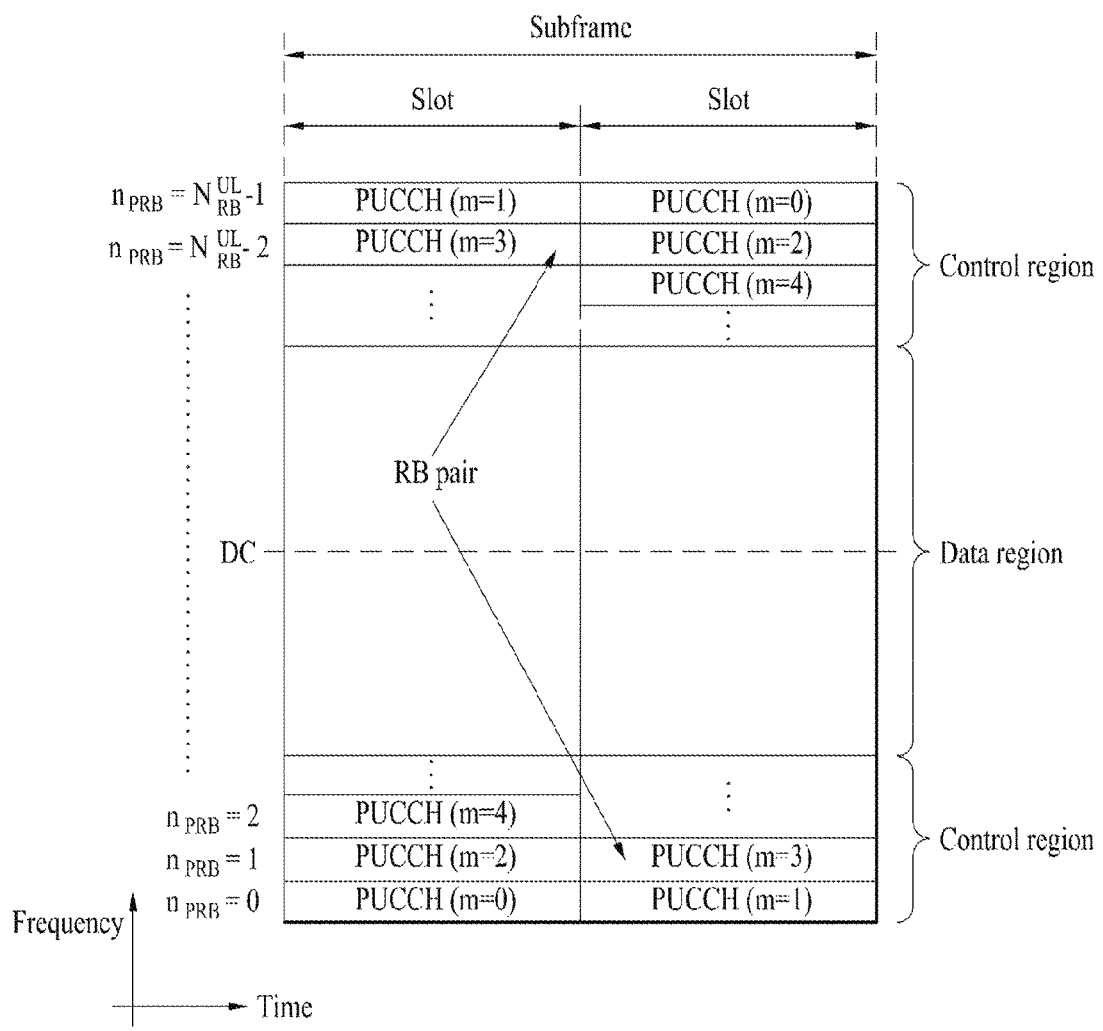
FIG. 8 illustrates the structure of a UL subframe used in a wireless communication system.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.
   Scheduling request (SR): SR is information used to request a UL-SCH resource and is transmitted using an on-off keying (OOK) scheme.
   HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.
   Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Figure 9:
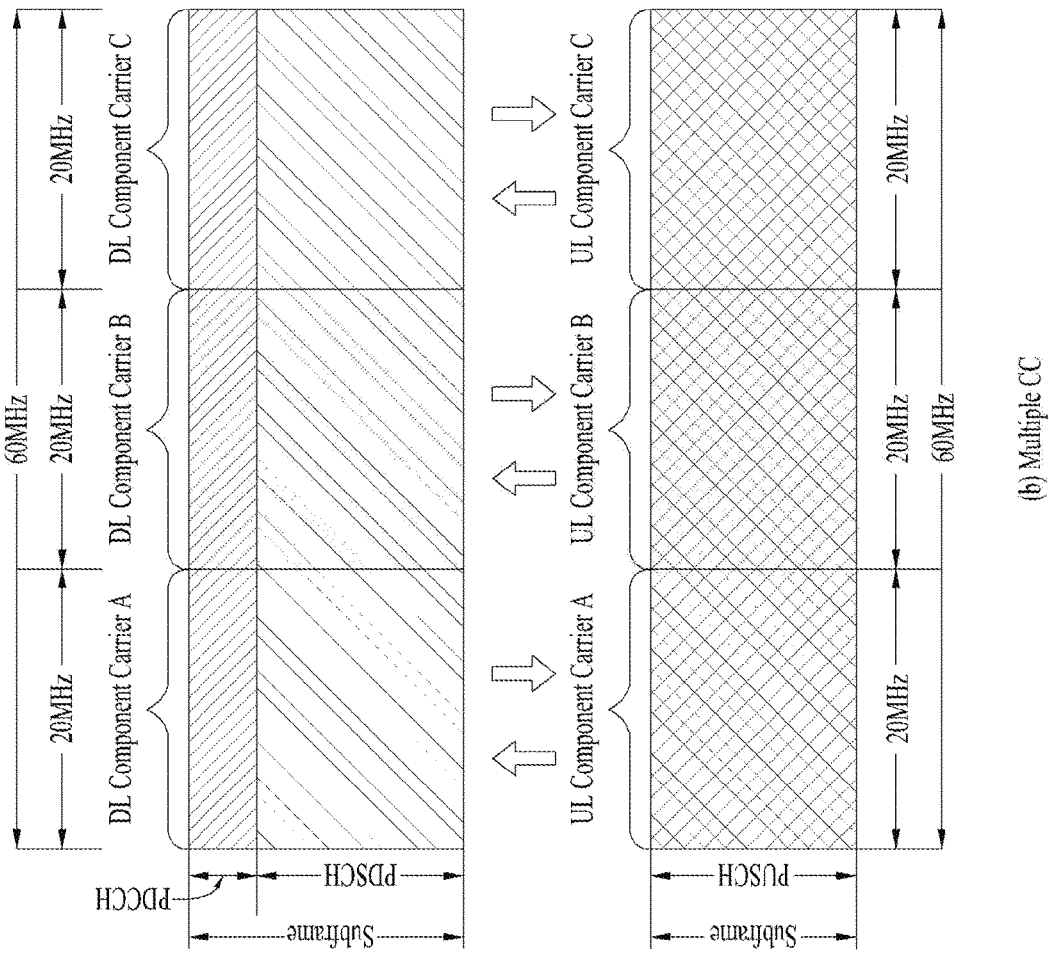
FIG. 9 is a diagram for explaining single-carrier communication and multi-carrier communication.
Figure 9:
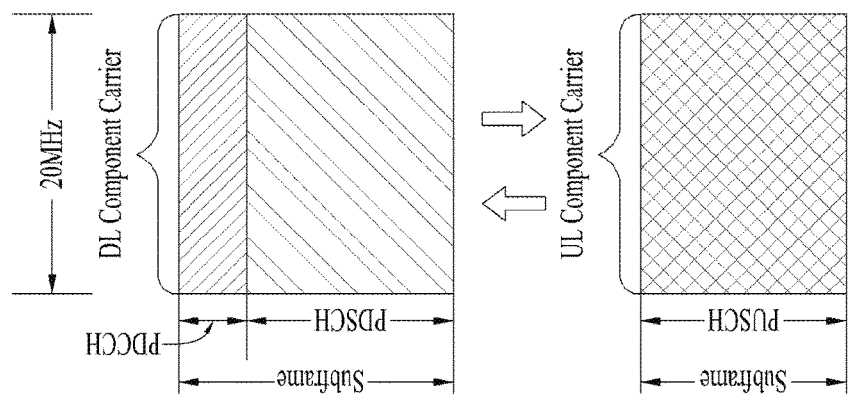

FIG. 9 is a diagram for explaining single-carrier communication and multi-carrier communication. Specially, FIG. 9(a) illustrates a subframe structure of a single carrier and FIG. 9(b) illustrates a subframe structure of multiple carriers.

Referring to FIG. 9(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 9(b), three 20 MHz CCs in each of UL and DL are aggregated to support a BW of 60 MHz. The CCs may be contiguous or non-contiguous in the frequency domain. Although FIG. 9(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 10:
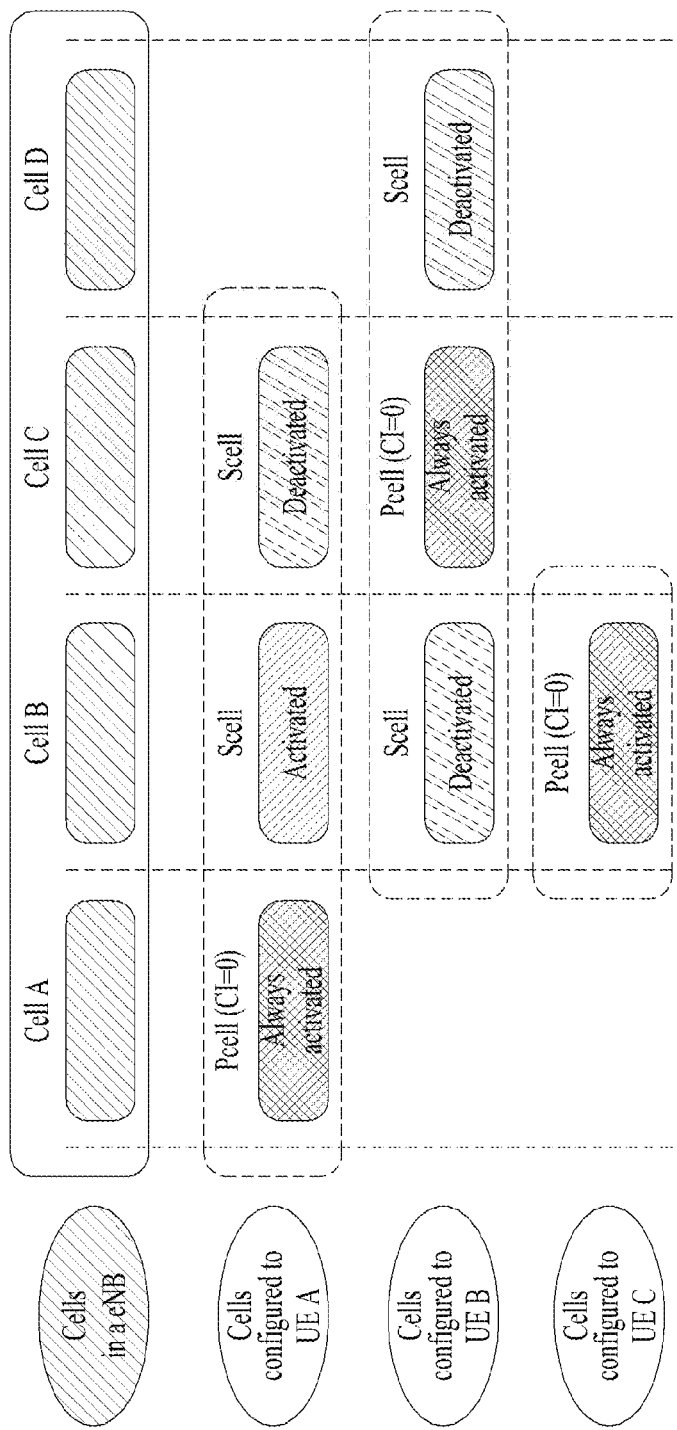
FIG. 10 illustrates the state of cells in a system supporting CA.

FIG. 10 illustrates the state of cells in a system supporting CA.

In FIG. 10, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 10, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). The baseline of PDCCH transmission is summarized as below.

CIF disabled: A PDCCH on a DL CC assigns PDSCH resources on the same DL CC or PUSCH resources on a single linked UL CC
No CIF
Same as an LTE PDCCH structure (same coding and same CCE-based resource mapping) and as a DCI format
CIF enabled: a PDCCH on a DL CC can assign PDSCH/PUSCH resources on a specific DL/UL CC among a plurality of aggregated DL/UL CCs using a CIF.
Extended LTE DCI format with CIF
CIF (if configured) is a fixed x-bit field (e.g. x=3).
CIF (if configured) location is fixed regardless of DCI format size.
Reuse of the LTE PDCCH structure (same coding and same CCE-based resource mapping)

One or more scheduling cells may be configured for one UE and one of the scheduling cells may be a PCC which is in charge of specific DL control signaling and UL PUCCH transmission. A scheduling cell set may be configured UE-specifically, UE-group-specifically, or cell-specifically. The scheduling cell may be configured so as to directly schedule at least itself. That is, the scheduling cell may become a scheduled cell thereof. In the present invention, a cell carrying a PDCCH is referred to as a scheduling cell, a monitoring cell, or an MCC and a cell carrying a PDSCH/PUSCH scheduled by the PDCCH is referred to as a scheduled cell.

The scheduling cell includes a DL CC as a part of all carrier aggregated cells. The UE detects/decodes the PDCCH only on a corresponding DL CC. In this case, a PDSCH/PUSCH of the scheduling cell or a scheduled cell refers to a PDSCH/PUSCH configured to be transmitted on the corresponding cell. A PHICH of the scheduling cell or the scheduled cell refers to a PHICH carrying ACK/NACK for a PUSCH transmitted on the corresponding cell.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that an STA or an AP does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

The present invention proposes a scheduling scheme and a HARQ-ACK feedback configuration and transmission method, considering a CA situation including a cell/carrier, in which an available resource duration is aperiodically or discontinuously secured/configured as in an unlicensed band in which exclusive use of a specific system is not guaranteed.

Prior to description of embodiments of the present invention, an IEEE 802.11 system will be described in detail as an example of a CSMA based system to which the embodiments of the present invention are applicable. Although the IEEE 802.11 system is described as an example of the CSMA based system for convenience, the embodiments of the present invention may be applied to other CSMA based systems.

Figure 11:
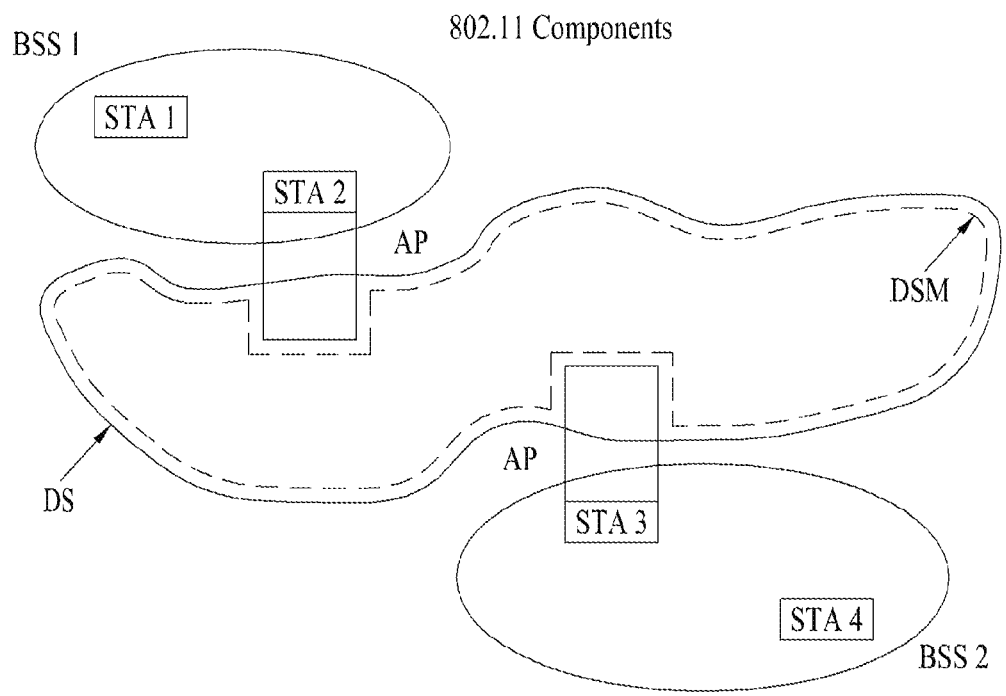
FIG. 11 is a diagram illustrating an IEEE 802.11 system to which the present invention is applicable.

FIG. 11 is a diagram illustrating an exemplary structure of an IEEE 802.11 system to which the present invention is applicable.

The structure of the IEEE 802.11 system may be configured by a plurality of components and may provide a WLAN that supports station (STA) mobility transparent for higher layers according to interaction of the components. In a WLAN system, an STA is a device operating according to MAC/PHY specifications of IEEE 802.11. The STA includes an AP STA and a non-AP STA. The non-AP STA corresponds to a device that a user generally handles in person, such as a laptop computer or a mobile phone.

The non-AP STA may be referred to as a terminal, a wireless transmit/receive unit (WTRU), a user equipment (UE), a mobile station (MS), a mobile terminal (MT), a mobile subscriber station (MSS), etc. The AP may correspond to a base station (BS), a Node-B, an evolved Node-B (eNB), a base transceiver system (BTS), a femto BS, a pico BS, etc. in other wireless communication fields.

Referring to FIG. 11, a basic service set (BSS) may correspond to a basic component block in an IEEE 802.11 LAN. An ellipse that defines a BSS in FIG. 11 may indicate a coverage area in which STAs belonging to the corresponding BSS maintain communication. This area may be referred to as a basic service area (BSA). If an STA moves out of the BSA, the STA cannot directly communicate with other STAs in the BSA.

The most basic type of BSS in the IEEE 802.11 LAN is an independent BSS (IBSS). For example, the IBSS may have a minimum configuration including only two STAs. This configuration is possible when STAs can directly communicate with each other. This type of LAN may be configured as necessary rather than being pre-designed and configured and may be called an ad-hoc network.

When an STA is turned on or off, or enters or leaves the coverage of a BSS, membership of STAs in the BSS may be dynamically changed. To become a member of the BSS, an STA may join the BSS using a synchronization procedure. To access all services based on the BSS, an STA needs to be associated with the BSS. Such association may be dynamically configured and may use a distribution system service (DSS).

In a LAN, a direct STA-to-STA distance may be limited by physical (hereinafter, PHY) layer performance. While this distance limit may be sufficient in some cases, communication between STAs having a longer distance therebetween may be needed in other cases. To support an extended coverage, a distribution system (DS) may be configured.

The DS refers to a structure in which BSSs are connected to each other. Specifically, BSSs may be present as components of an extended form of a network composed of a plurality of BSSs rather than being independently present.

The DS is a logical concept and may be specified by characteristics of a distribution system medium (DSM). In IEEE 802.11 standards, a wireless medium (WM) and the DSM are logically discriminated. These logical media are used by different components for different purposes. In definition of IEEE 802.11 standards, the media are not limited as the same medium or different media. The fact that plural media are logically different from each other may explain flexibility of an IEEE 802.11 LAN structure (a DS structure or other network structures). That is, the IEEE 802.11 LAN structure may be implemented in various manners and may be independently specified by physical characteristics of implementations thereof.

The DS may support mobile devices by providing seamless integration of a plurality of BSSs and providing logical services necessary to handle addresses to a destination.

The AP (i.e. an AP STA) refers to an entity that enables associated STAs to access the DS through the WM and has STA functionality. Data may be transmitted between a BSS and the DS through the AP. For example, STA2 and STA3 shown in FIG. 11 have STA functionality and provide a function of enabling associated STAs (STA1 and STA4) to access the DS. In addition, all APs are addressable entities because they basically correspond to STAs. An address used by an AP for communication on the WM does not necessarily need to be equal to an address used by the AP for communication on the DSM.

Data transmitted from one of STAs associated with an AP to an STA address of the AP may be received at an uncontrolled port at all times and processed by an IEEE 802.1X port access entity. In addition, the transmitted data (or frame) may be delivered to the DS when a controlled port is authenticated.

A wireless network having arbitrary size and complexity may include a DS and BSSs. In an IEEE 802.11 system, this type of network is referred to as an extended service set (ESS). The ESS may correspond to a set of BSSs connected to one DS. However, the ESS does not include the DS. Characteristically, the ESS network appears as an IBSS network in a logical link control (LLC) layer. STAs included in the ESS may communicate with each other and may moves from one BSS to another BSS (in the same ESS), transparently to LLC.

In IEEE 802.11, relative physical locations of the BSSs in FIG. 11 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One IBSS or ESS network (or more than one IBSS or ESS network) may be physically located in the same space as one ESS network (or more than one ESS network). This may correspond to an ESS network form in the case in which an ad-hoc network operates at a location in which an ESS network is present, the case in which IEEE 802.11 networks of different organizations physically overlap, or the case in which two or more different access and security policies are necessary in the same location.

In a WLAN system based on IEEE 802.11, a basic access mechanism of MAC is a CSMA/CA mechanism. The CSMA/CA mechanism is also called a distributed coordination function (DCF) of IEEE 802.11 MAC and basically adopts an access mechanism of "listen before talk". According to this type of access mechanism, an AP and/or an STA may perform CCA for sensing a radio channel or a medium for a predetermined time duration (e.g. DCF inter-frame space (DIFS) prior to starting transmission. If it is determined that the medium is in an idle state as a sensing result, the AP and/or the STA starts to transmit a frame through the medium. Meanwhile, if it is sensed that the medium is in an occupied state, the AP and/or the STA may attempt to transmit the frame after waiting a delay duration for medium access (e.g. a random backoff period) without starting transmission thereof. Since it is expected that multiple STAs attempt to perform frame transmission after waiting different times by applying the random backoff period, collision can be minimized.

Hereinafter, there are provided embodiments of a HARQ operation for a carrier aggregation situation including a cell/carrier on which an available resource duration is aperiodically and/or discontinuously secured/configured as in an LTE-U system that opportunistically operates based on carrier sensing in the aforementioned unlicensed band.

Figure 12:
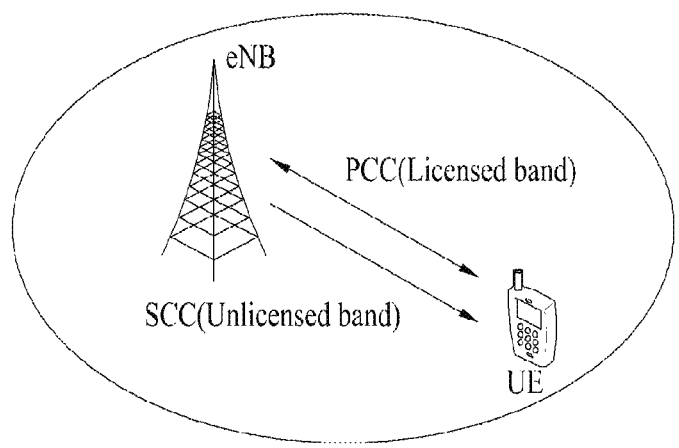
FIG. 12 illustrates a carrier aggregation situation of a 3GPP LTE-A band, which is a licensed band, and an unlicensed band (hereinafter, LTE-U band).

FIG. 12 illustrates a carrier aggregation situation of a 3GPP LTE-A band, which is a licensed band, and an unlicensed band (hereinafter, an LTE-U band).

Referring to FIG. 12, an eNB may transmit a signal to a UE or the UE may transmit a signal to the eNB in the carrier aggregation situation of the LTE-A band and the LTE-U band. In the following description, it is assumed for convenience of description of proposed schemes that the UE is configured to perform wireless communication through two component carriers (CCs) in the LTE-A band and the LTE-U band. As an example, a CC of the LTE-A band may be configured as a PCC and a CC of the LTE-U band may be configured as an SCC. However, the embodiments of the present invention may be extensively applied to a situation in which a plurality of LTE-A bands and a plurality of LTE-U bands are used by a carrier aggregation scheme or may be applied even when signal transmission/reception between the eNB and the UE is performed only in the LTE-U band. In addition, the embodiments of the present invention may be extensively applied not only to the 3GPP LTE/LTE-A system but also to systems having other characteristics.

Hereinafter, for convenience of description, a cell that is configured in a licensed band for 3GPP LTE/LTE-A and operates by a 3GPP LTE/LTE-A scheme will be referred to as an Lcell and a cell that is configured in an unlicensed band operating by an LTE-U scheme and operates by the LTE-U scheme will be referred to as a Ucell.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy or continuously transmitting an RS and/or a data signal so that a signal of a specific power level or more may be seamlessly transmitted during the RRP. Thus, if the eNB has determined an RRP during which the eNB desires to occupy an LTE-U band, the eNB may pre-inform the UE of the RRP to cause the UE to maintain a communication transmission/reception link during the indicated RRP. As a scheme in which the eNB informs the UE of related RRP information, the eNB may transmit the RRP information to the UE through another CC (e.g. the LTE-A band) which is associated in a CA form.

On a cell used for legacy carrier aggregation, i.e. on an Lcell, an RS for channel synchronization or an RS for channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the synchronization/measurement RSs will appear aperiodically and/or discontinuously on the Ucell.

Meanwhile, on the Lcell, although the UE is configured to detect the RS(s) or perform synchronization or measurement using the RS(s) for a time duration while the Lcell is activated, the RS(s) may be transmitted for a time duration while the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a PDCCH of a PCell (i.e. through cross carrier scheduling (CCS)) or through a PDCCH of the SCell and attempt to transmit/receive data. In this case, for example, the eNB may configure an RRP including M consecutive subframes (SFs). Here, the eNB may pre-inform the UE of the M value and usage of the M SFs through higher layer signaling (using the PCell) or through a physical control/data channel. A start timing of the RRP may be periodically or semi-statically configured through higher layer signaling. If the start timing of the RRP should be set to SF #n, the start timing of the RRP may be designated through physical layer signaling in SF #n or SF #(n−k).

Figure 13:
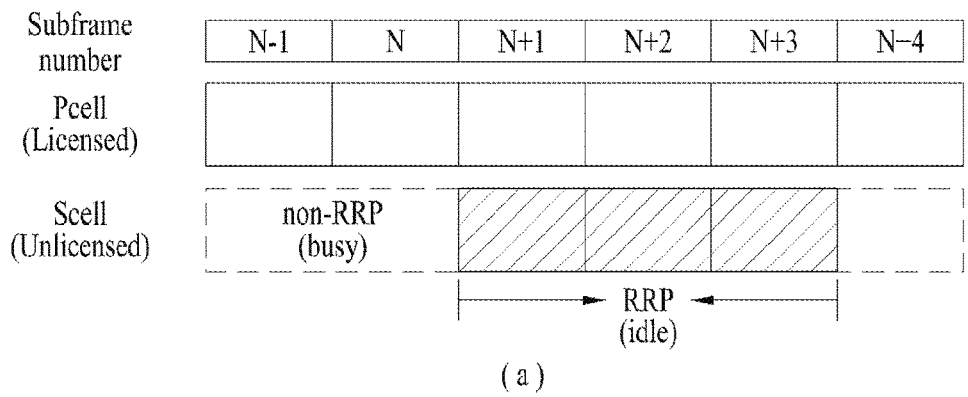
FIG. 13 illustrates a subframe configuration of a reserved resource period (RRP).
Figure 13:
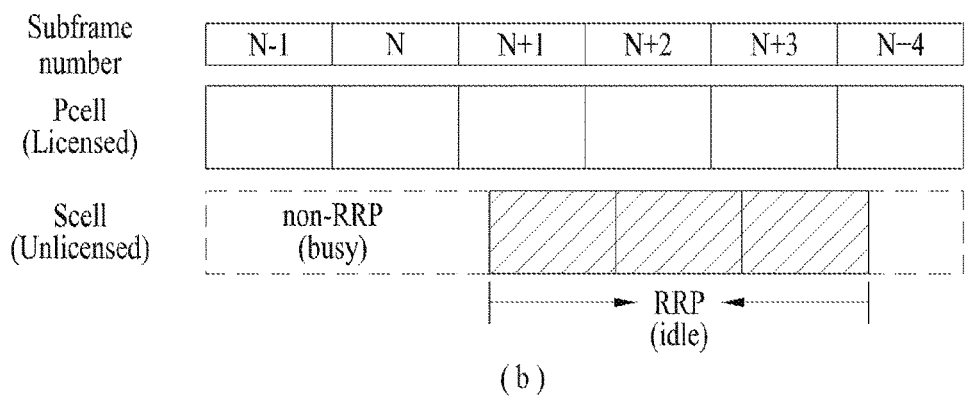

FIG. 13 illustrates a subframe configuration of an RRP.

The RRP may be configured such that boundaries of subframe(s) constituting the RRP are aligned with boundaries of subframe(s) configured on a Pcell, as illustrated in FIG. 13(a), or such that the boundaries of the subframe(s) constituting the RRP are misaligned with the boundaries of the subframe(s) configured on the Pcell, as illustrated in FIG. 13(b).

<Scheduling Scheme>

Embodiments of a scheduling scheme according to the present invention, for a carrier aggregation (CA) situation including a cell/carrier on which an available resource duration is aperiodically and/or discontinuously secured/configured as in an LTE-U system, will now be described with reference to FIG. 14 to FIG. 16.

Figure 14:
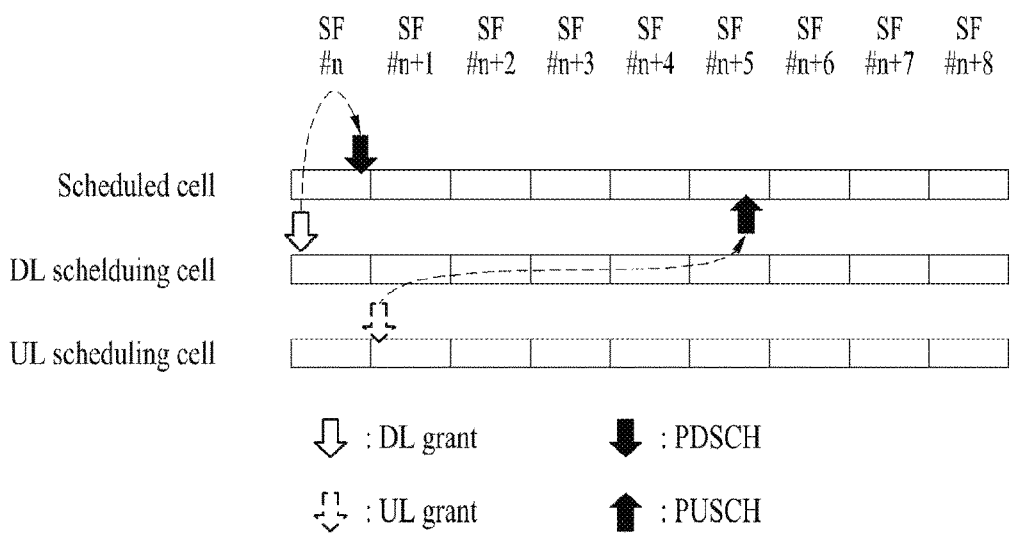
FIG. 14 to FIG. 16 are diagrams for explaining embodiments of the present invention associated with a scheduling scheme for any one of carrier-aggregated cells in a situation in which an unlicensed band can be aggregated as one cell of carrier aggregation.
Figure 15:
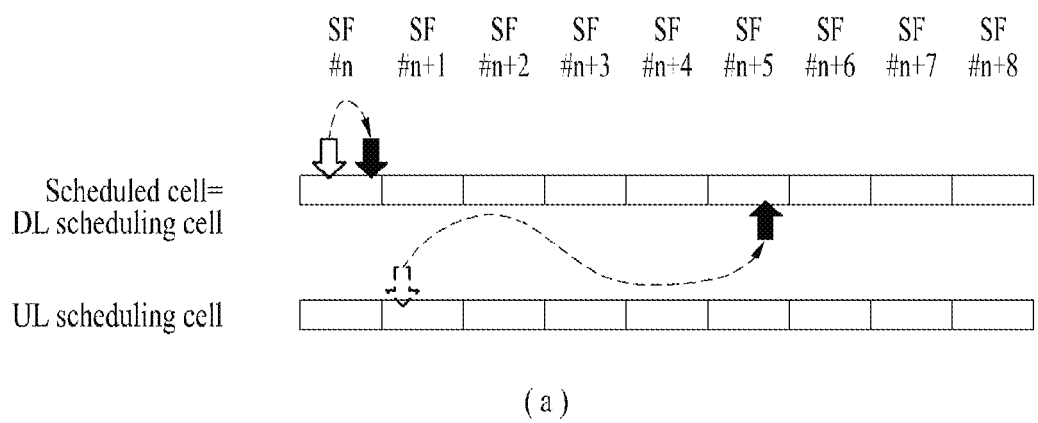
Figure 15:
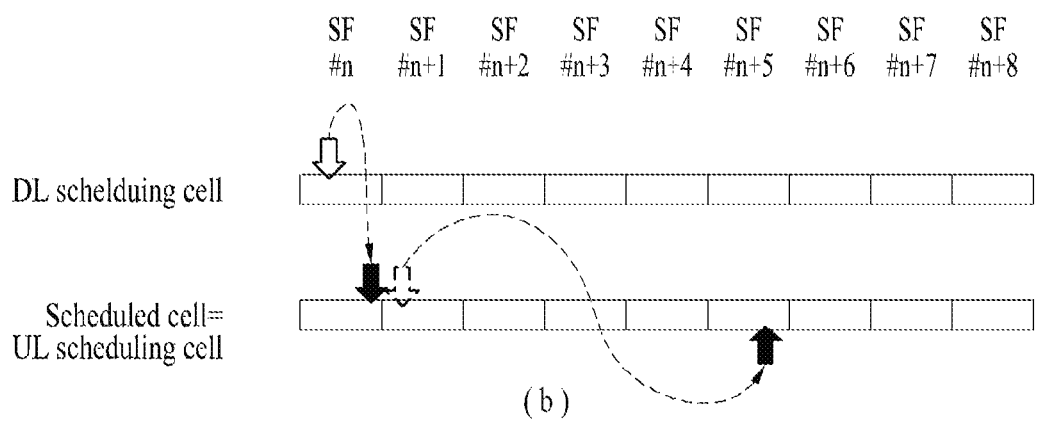
Figure 16:
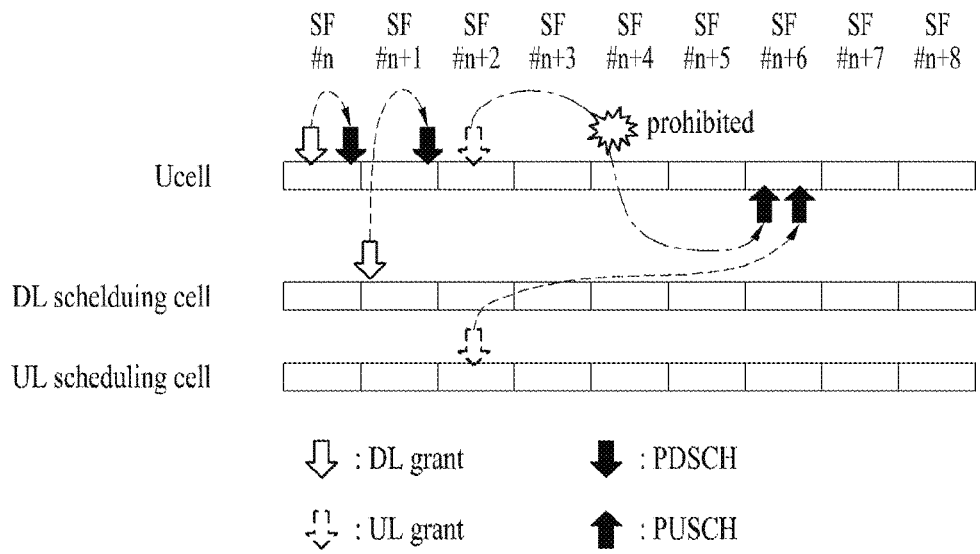

FIG. 14 to FIG. 16 are diagrams for explaining embodiments of the present invention associated with a scheduling scheme for any one of carrier-aggregated cells in a situation in which an unlicensed band can be aggregated as one cell of CA. Although a DL grant and a UL grant are illustrated as being transmitted/received in different subframes in FIG. 14 to FIG. 16, one or more DL grants and/or UL grants may be transmitted/received in one subframe.

For scheduling for a specific Ucell (e.g. Ucell 1):

Opt 1) Ucell 1 may be configured to be cross-CC scheduled from an Lcell,

Opt 2) Ucell 1 may be configured to be self-CC scheduled therefrom, or

Opt 3) Ucell 1 may be configured to be cross-CC scheduled from another Ucell 2.

The Lcell may not be permitted to be configured to be cross-CC scheduled from the Ucell. That is, the Ucell may not be permitted to schedule the Lcell, regardless of whether the Lcell is a Pcell or an Scell.

According to cross-CC scheduling of a legacy system, only one scheduling cell may be configured per scheduled cell. In other words, a plurality of scheduling cells cannot be configured for one scheduled CC.

However, in Opt 3, there is a restriction in that Ucell 1 can be scheduled from Ucell 2 only when a result of performing carrier sensing for (scheduling) Ucell 2 indicates an idle state even if a result of performing carrier sensing for (scheduled) Ucell 1 is determined as an idle state (of a radio channel).

Accordingly, in terms of the above problem, a method of configuring Ucell 1 may be considered so that Ucell 1 may be cross-CC scheduled from Ucell 2 or a specific Lcell. That is, the present invention proposes an embodiment in which a plurality of cells is configured as a scheduling cell for one cell.

For example, both Ucell 2 and the specific Lcell may be configured as scheduling cells for Ucell 1. Therefore, Ucell 1 may be configured to be cross-CC scheduled from one of a plurality of scheduling cells at an arbitrary timing. Additionally, Ucell 2 and the specific Lcell may be replaced by/configured as Lcell 1 and Lcell 2, respectively. Furthermore, the above method may be applied without restriction on cell type. In other words, the present embodiment may be applied by generalizing Ucell 1, Ucell 2, and a specific Lcell to cell 1, cell 2, and cell 3, respectively.

As another method, only one of Opt 1 and Opt 2 may be limitedly configured with respect to the Ucell.

Meanwhile, a DL duration on the Ucell may be configured based on carrier sensing by an eNB, whereas a UL duration on the Ucell may be configured based on carrier sensing by a UE. Therefore, the DL duration on the Ucell may not have any problem in terms of self-CC scheduling and cross-CC scheduling, whereas the UL duration on the Ucell may not be easy or efficient in applying a specific scheduling scheme (e.g. self-CC scheduling) relative to the DL duration. To cause UL scheduling for the Ucell to be successful, not only should the eNB succeed in sensing a DL carrier which is to be used to transmit UL scheduling, but the UE should succeed in sensing a UL carrier which is to be used to transmit a UL signal according to UL scheduling.

From the above viewpoint, for a system in which the Ucell can be carrier-aggregated, the present invention proposes that a DL scheduling cell and a UL scheduling cell be independently configured with respect to a scheduled cell as illustrated in FIG. 14. The DL scheduling cell or the UL scheduling cell may be configured to be different from a scheduled cell as illustrated in FIG. 14 or to be the same as the scheduled cell as illustrated in FIG. 15.

While the present embodiment may be applied regardless of cell type as illustrated in FIG. 14 and FIG. 15, the present embodiment may be limitedly applied to scheduling of a Ucell. For example, only one scheduling cell may be configured for scheduling of an Lcell and the DL scheduling cell and the UL scheduling cell may be independently configured with respect to the Ucell. The DL scheduling cell or the UL scheduling cell for the Ucell may be configured to be same as or different from the Ucell. For example, the DL scheduling cell may be configured as the Ucell itself and the UL scheduling cell may be configured as a cell (e.g. Lcell) other than the Ucell.

As described earlier, to perform UL transmission on the Ucell, both a DL time-frequency resource for transmission of DCI carrying scheduling information of UL transmission and a UL time-frequency resource on which UL transmission is to be performed should be in an idle state. That is, both an RRP for DL transmission and an RRP for UL transmission in association with DL transmission should be secured. Because of this restriction, DL transmission on the Ucell has no problem in terms of performing self-CC scheduling and cross-CC scheduling, whereas it is not easy to apply self-CC scheduling for UL transmission. Therefore, self-CC scheduling for DL transmission may be permitted with respect to the Ucell, whereas self-CC scheduling for UL transmission may not be permitted with respect to the Ucell, as illustrated in FIG. 16. For example, referring to FIG. 16, UL transmission on the Ucell may be scheduled by another Ucell other than the above Ucell or by an Lcell. A cross-CC scheduling cell for UL transmission on the Ucell may be limited to the Lcell rather than the Ucell.

Specifically, DL-dedicated DCI (e.g. DCI format 2C/2D) based scheduling for the Ucell may be performed through a DL scheduling cell (or scheduling cell 1) and UL-dedicated DCI (e.g. DCI format 4) based scheduling may be performed through a UL scheduling cell (or scheduling cell 2). DL/UL-common DCI (e.g. DCI format 0/1A) based scheduling may be performed through the DL scheduling cell and/or the UL scheduling cell.

More specifically, DL/UL-common DCI based scheduling may be configured by the following three schemes according to a DCI format.

Alt 1) DCI Format 1A by the DL Scheduling Cell and DCI Format 0 by the UL Scheduling Cell In this scheme, DCI format 1A based scheduling may be configured to be performed through the DL scheduling cell and DCI format 0 based scheduling may be configured to be performed through the UL scheduling cell. To this end, a PDCCH candidate and the number of blind decoding procedures that have been allocated to one legacy DCI format 0/1A may be distributively configured/allocated to DCI format 1A (a PDCCH search space on the DL scheduling cell for DCI format 1A) and DCI format 0 (a PDCCH search space on the UL scheduling cell for DCI format 0). In this case, a DL/UL flag-bit configuration for distinguishing between DCI format 1A and DCI format 0 may be omitted.

Alt 2) DCI Format 0/1A by One of the DL Scheduling Cell and the UL Scheduling Cell In this case, DCI format 0/1A based scheduling may be configured to be performed through one specific cell of the DL scheduling cell and the UL scheduling cell. Therefore, a PDCCH candidate and blind decoding for DCI format 0/1A may be configured/allocated only on one specific cell of the DL scheduling cell and the UL scheduling cell.

Alt 3) DCI Format 0/1A by Both the DL Scheduling Cell and the UL Scheduling Cell In this scheme, DCI format 0/1A based scheduling may be configured to be performed through any one of the DL scheduling cell and the UL scheduling cell. That is, the UE may be configured to attempt to detect DCI format 0/1A on both cells. To this end, a PDCCH candidate and the number of blind decoding procedures which have been allocated to one legacy DCI format 0/1A may be distributively configured/allocated to a PDCCH search space on the DL scheduling cell and a PDCCH search space on the UL scheduling cell.

The embodiments of Alt 1 to Alt 3 may be applied without restriction on cell type. For example, the embodiments of Alt 1 to Alt 3 may be applied by generalizing the above-described Ucell to an arbitrary cell.

Meanwhile, when self-CC scheduling is configured with respect to the Ucell, DCI for scheduling data transmission on the Ucell may be transmitted through a DL resource on the Ucell. However, an interference source which is not identified through carrier sensing (CS) may be present on the Ucell due to a characteristic of a contention based operation in an unlicensed band. Such interference may lower stability of DCI transmission. In consideration of this problem, according to an embodiment of the present invention, a CCE aggregation level of a PDCCH for DCI transmitted on the Ucell may be higher than that on a normal cell. For example, if the CCE aggregation levels 1/2/4/8 are used for the normal cell, the CCE aggregation levels increased to 2/4/8/16 may be used for the Ucell or only partially increased CCE aggregation levels (e.g. 2/4/8) may be configured for the Ucell. Alternatively, the number of PDCCH candidates per CCE aggregation level may be defined so that the number of PDCCH candidates having a high CCE aggregation level may increase. For example, when the number of PDCCH candidates for CCE aggregation levels 1/2/4/8 in the normal Lcell is 6/6/2/2, respectively, the number of PDCCH candidates in the Ucell may be 2/6/6/2, 6/4/4/2, or 4/4/4/4, respectively. This method may also be applied when cross-CC scheduling is configured from another Ucell with respect to the Ucell.

<HARQ-ACK Feedback>

Embodiments of the present invention regarding a HARQ-ACK feedback configuration and transmission method for a CA situation including a cell/carrier on which an available resource duration is aperiodically and/or discontinuously secured/configured as in an LTE-U system are described. The embodiments of the present invention which will be described below may be applied together with any one of the above-described scheduling embodiments of the present invention.

Specifically, a CA situation between a Pcell operating according to an FDD scheme and an Scell operating according to an LTE-U scheme is considered. An LTE-U based Scell is defined as a Ucell for convenience and a resource duration aperiodically secured/configured on the Ucell is defined as an RRP for convenience. In addition, it is assumed that all subframes constituting each RRP are basically configured as DL subframes and, for DL scheduling for the RRP:

1) a scheme in which one DL grant DCI schedules only one DL subframe (at the same subframe timing) (hereinafter, single-SF scheduling) as in a legacy scheme may be applied, or 2) a scheme in which one DL grant DCI simultaneously schedules a plurality of DL subframes (hereinafter, multi-SF scheduling) may be applied. In the present invention, the Pcell may mean a cell configured to transmit a PUCCH carrying HARQ-ACK feedback for reception of DL data on a Ucell (and/or a common search space (CSS) based PDCCH carrying (Ucell related) UE-common information). In the present invention, a PDCCH may include an EPDCCH in the form of being transmitted through a legacy PDSCH region.

The present invention proposes a HARQ-ACK feedback timing configuration and a HARQ-ACK bit configuration scheme for CA including an RRP based Ucell and a PUCCH resource allocation method, based on the above-described conditions. Hereinafter, PUCCH format 3, and PUCCH format 1b with channel selection will be referred to as PF3 and CHsel, respectively.

PUCCH format 1b with channel selection and PUCCH format 3 will now be described first and embodiments of the present invention related to a HARQ-ACK transmission/reception method will be described later.

Figure 17:
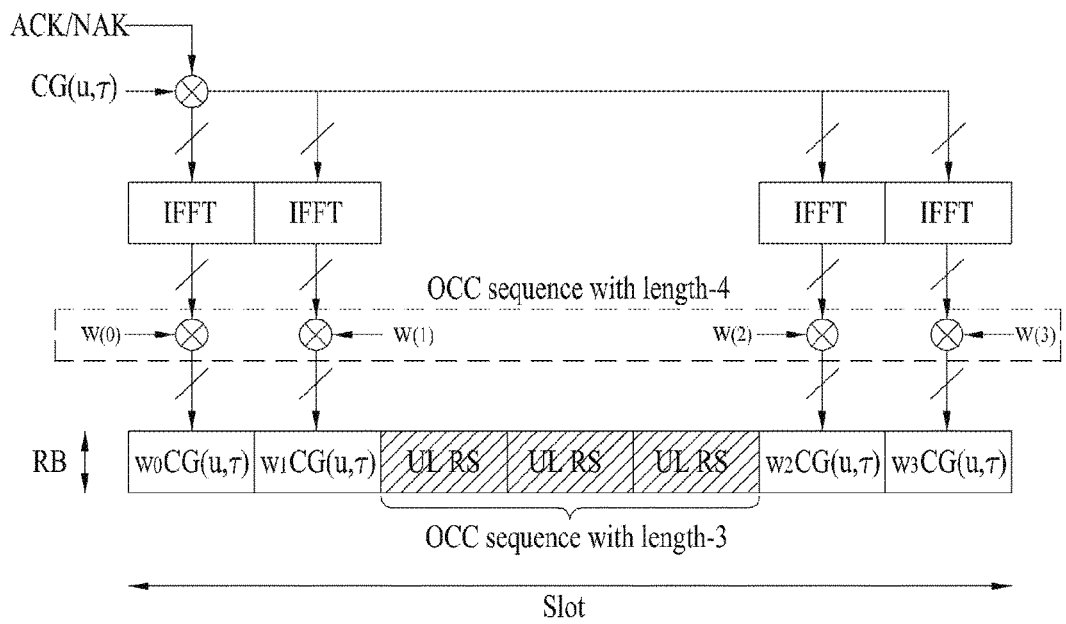
FIG. 17 exemplarily shows slot level structures of a PUCCH format.

FIG. 17 exemplarily shows slot level structures of a PUCCH format. Particularly, FIG. 17 shows the PUCCH format 1a and 1b structure in case of a normal CP.

In the PUCCH format 1a and 1b structure, the same control information is repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences [w(0) w(1) w(2) w(3)] may be applied to either an arbitrary time domain (after FFT modulation) or an arbitrary frequency domain (before FFT modulation).

For an SR and persistent scheduling, ACK/NACK resources including CSs, OC sequences, and PRBs may be provided to a UE through RRC. For dynamic ACK/NACK and non-persistent scheduling, ACK/NACK resources may be implicitly provided to the UE by the lowest Control Channel Element (CCE) index of a PDCCH corresponding to a PDSCH.

Figure 18:
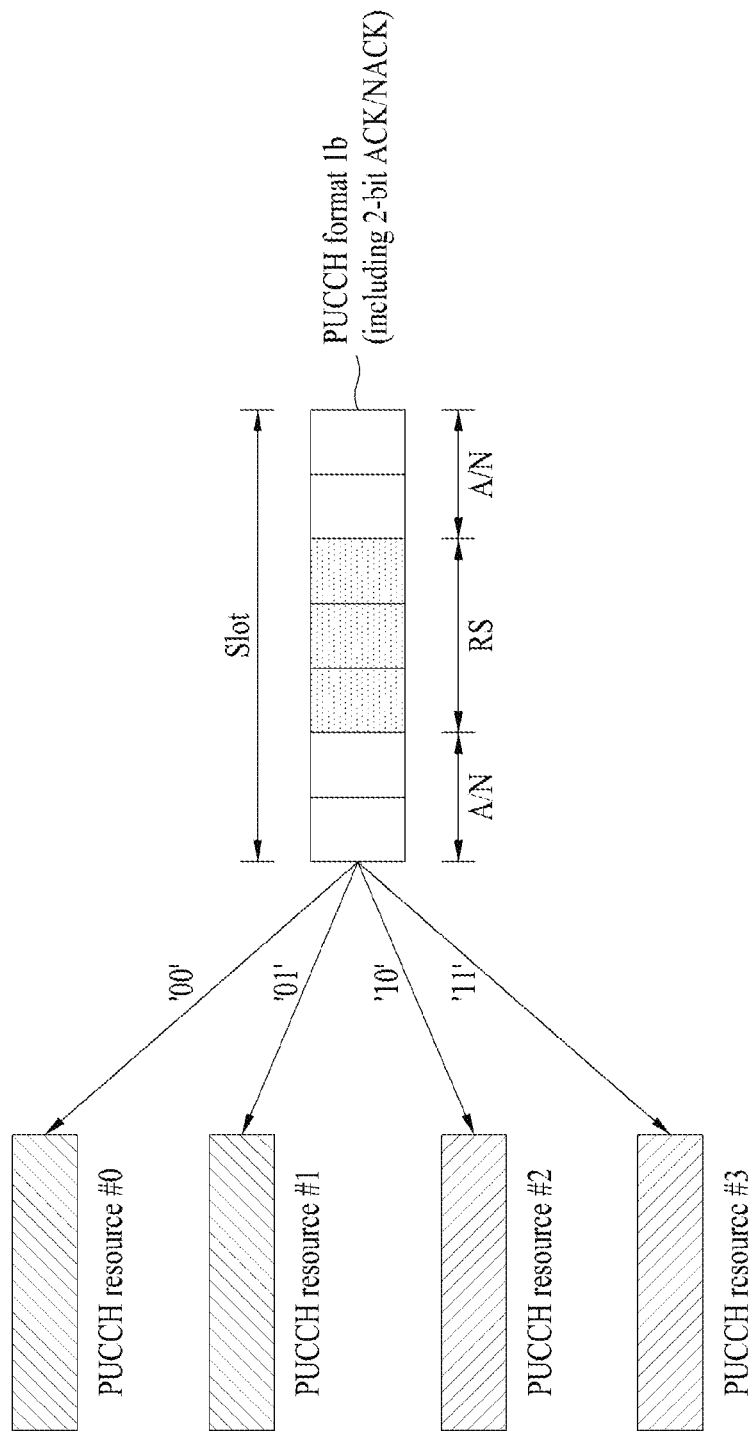
FIG. 18 shows exemplary ACK/NACK transmission based on channel selection.

FIG. 18 shows exemplary ACK/NACK transmission based on channel selection.

A scheme for transmitting information by data constellation and by selection of specific resources among a plurality of resources defined using RSs and data is referred to as a channel selection transmission scheme.

Referring to FIG. 18, four PUCCH resources (PUCCH resources #0 to #4) may be configured for PUCCH format 1b for 2-bit ACK/NACK feedback. If 4-bit ACK/NACK information is transmitted, 2 bits among the 4-bit ACK/NACK information may be expressed through 2-bit information carried by PUCCH format 1b and the other 2 bits may be expressed according to which resource of the four resources is selected. For example, it may be predefined that transmission of UCI using PUCCH resource #0 indicates '00' and transmission of the UCI using PUCCH resource #1 indicates '01'. Therefore, since two bits (00, 01, 10, or 11) may be expressed by selecting one of the four PUCCH resources, additional 2-bit ACK/NACK information may be expressed in addition to 2-bit ACK/NACK information expressed through PUCCH format 1b.

Which bit should be transmitted on which PUCCH resource may be predetermined according to ACK/NACK states. That is, a mapping table of ACK/NACK state versus PUCCH resources versus transmission bits (or complex modulation symbols) may be predefined and may be pre-stored in a BS and a UE.

According to a predefined mapping table, the UE may inform the eNB of an ACK/NACK state by transmitting, in subframe n, transmission bit(s) b(0)b(1) using PUCCH format 1b on a PUCCH resource on $n^{(1)}_{PUCCH}$ selected from among A PUCCH resources $n^{(1)}_{PUCCH,j}$ (where $0 \leq j \leq A-1$). The following tables illustrate mapping tables for selecting a PUCCH format 1b HARQ-ACK transmission channel to select a PUCCH resource from among A PUCCH resources.

TABLE 4

Transmission of Format 1b HARQ-ACK channel selection for A = 2

| HARQ-ACK(0) | HARQ-ACK(1) | $n^{(1)}_{PUCCH}$ | b(0)b(1) |
|---|---|---|---|
| ACK | ACK | $n^{(1)}_{PUCCH,1}$ | 1, 1 |
| ACK | NACK/DTX | $n^{(1)}_{PUCCH,0}$ | 1, 1 |
| NACK/DTX | ACK | $n^{(1)}_{PUCCH,1}$ | 0, 0 |
| NACK | NACK/DTX | $n^{(1)}_{PUCCH,0}$ | 0, 0 |
| DTX | NACK/DTX | No Transmission | |

TABLE 5

Transmission of Format 1b HARQ-ACK channel selection for A = 3

| HARQ-ACK(0) | HARQ-ACK(1) | HARQ-ACK(2) | $n^{(1)}_{PUCCH}$ | b(0)b(1) |
|---|---|---|---|---|
| ACK | ACK | ACK | $n^{(1)}_{PUCCH,1}$ | 1, 1 |
| ACK | NACK/DTX | ACK | $n^{(1)}_{PUCCH,1}$ | 1, 0 |
| NACK/DTX | ACK | ACK | $n^{(1)}_{PUCCH,1}$ | 0, 1 |
| NACK/DTX | NACK/DTX | ACK | $n^{(1)}_{PUCCH,2}$ | 1, 1 |
| ACK | ACK | NACK/DTX | $n^{(1)}_{PUCCH,0}$ | 1, 1 |
| ACK | NACK/DTX | NACK/DTX | $n^{(1)}_{PUCCH,0}$ | 1, 0 |
| NACK/DTX | ACK | NACK/DTX | $n^{(1)}_{PUCCH,0}$ | 0, 1 |
| NACK/DTX | NACK/DTX | NACK | $n^{(1)}_{PUCCH,1}$ | 0, 0 |
| NACK | NACK/DTX | DTX | $n^{(1)}_{PUCCH,0}$ | 0, 0 |
| NACK/DTX | NACK | DTX | $n^{(1)}_{PUCCH,0}$ | 0, 0 |
| DTX | DTX | DTX | No Transmission | |

TABLE 6

Transmission of Format 1b HARQ-ACK channel selection for A = 4

| HARQ-ACK(0) | HARQ-ACK(1) | HARQ-ACK(2) | HARQ-ACK(3) | $n^{(1)}_{PUCCH}$ | b(0)b(1) |
|---|---|---|---|---|---|
| ACK | ACK | ACK | ACK | $n^{(1)}_{PUCCH,1}$ | 1, 1 |
| ACK | NACK/DTX | ACK | ACK | $n^{(1)}_{PUCCH,2}$ | 0, 1 |
| NACK/DTX | ACK | ACK | ACK | $n^{(1)}_{PUCCH,1}$ | 0, 1 |
| NACK/DTX | NACK/DTX | ACK | ACK | $n^{(1)}_{PUCCH,3}$ | 1, 1 |
| ACK | ACK | ACK | NACK/DTX | $n^{(1)}_{PUCCH,1}$ | 1, 0 |
| ACK | NACK/DTX | ACK | NACK/DTX | $n^{(1)}_{PUCCH,2}$ | 0, 0 |
| NACK/DTX | ACK | ACK | NACK/DTX | $n^{(1)}_{PUCCH,1}$ | 0, 0 |
| NACK/DTX | NACK/DTX | ACK | NACK/DTX | $n^{(1)}_{PUCCH,3}$ | 1, 0 |
| ACK | ACK | NACK/DTX | ACK | $n^{(1)}_{PUCCH,2}$ | 1, 1 |
| ACK | NACK/DTX | NACK/DTX | ACK | $n^{(1)}_{PUCCH,2}$ | 1, 0 |
| NACK/DTX | ACK | NACK/DTX | ACK | $n^{(1)}_{PUCCH,3}$ | 0, 1 |
| NACK/DTX | NACK/DTX | NACK/DTX | ACK | $n^{(1)}_{PUCCH,3}$ | 0, 0 |
| ACK | ACK | NACK/DTX | NACK/DTX | $n^{(1)}_{PUCCH,0}$ | 1, 1 |
| ACK | NACK/DTX | NACK/DTX | NACK/DTX | $n^{(1)}_{PUCCH,0}$ | 1, 0 |
| NACK/DTX | ACK | NACK/DTX | NACK/DTX | $n^{(1)}_{PUCCH,0}$ | 0, 1 |
| NACK/DTX | NACK | NACK/DTX | NACK/DTX | $n^{(1)}_{PUCCH,0}$ | 0, 0 |
| NACK | NACK/DTX | NACK/DTX | NACK/DTX | $n^{(1)}_{PUCCH,0}$ | 0, 0 |
| DTX | DTX | NACK/DTX | NACK/DTX | No Transmission | | for a PDSCH transmission indicated by the detection of a corresponding PDCCH in subframe n−4 on the primary cell, or for a PDCCH indicating downlink SPS release in subframe n−4 on the primary cell, the PUCCH resource is $n^{(1)}_{PUCCH,j}=n_{CCE}+N^{(1)}_{PUCCH}$, and for transmission mode that supports up to two transport blocks, the PUCCH resource $n^{(1)}_{PUCCH,j+1}$ is given by $n^{(1)}_{PUCCH,j+1}=n_{CCE}+1+N^{(1)}_{PUCCH}$ where $n_{CCE}$ is the number of the first CCE used for transmission of the corresponding PDCCH and $N^{(1)}_{PUCCH}$ is configured by higher layers.

for a PDSCH transmission on the primary cell where there is not a corresponding PDCCH detected in subframe n−4, the value of $n^{(1)}_{PUCCH,j}$ is determined according to higher layer configuration and Table 7. For transmission mode that supports up to two transport blocks, the PUCCH resource $n^{(1)}_{PUCCH,j+1}$ is given by $n^{(1)}_{PUCCH,j+1}=n^{(1)}_{PUCCH,j}+1$.

TABLE 7

PUCCH resource value for downlink semi-persistent scheduling

| Value of 'TPC command for PUCCH' | $n^{(1,p)}_{PUCCH}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers | for a PDSCH transmission indicated by the detection of a corresponding PDCCH in subframe n−4 on the secondary cell, the value of $n_{PUCCH,j}^{(1)}$ and the value of $n_{PUCCH,j+1}^{(1)}$ for the transmission mode that supports up to two transport blocks is determined according to higher layer configuration and Table 8. The TPC field in the DCI format of the corresponding PDCCH shall be used to determine the PUCCH resource values from one of the four resource values configured by higher layers, with the mapping defined in Table 8. For a UE configured for a transmission mode that supports up to two transport blocks a PUCCH resource value in Table 8 maps to two PUCCH resources ($n^{(1)}_{PUCCH,j}$, $n^{(1)}_{PUCCH,j+1}$), otherwise, the PUCCH resource value maps to a single PUCCH resource $n_{PUCCH,j}^{(1)}$.

TABLE 8

PUCCH resource value for HARQ-ACK resource for PUCCH

| Value of 'TPC command for PUCCH' | $n^{(1)}_{PUCCH,j}$ or ($n^{(1)}_{PUCCH,j}$, $n^{(1)}_{PUCCH,j+1}$) |
|---|---|
| '00' | The 1st PUCCH resource value configured by the higher layers |
| '01' | The 2ndt PUCCH resource value configured by the higher layers |
| '10' | The 3rd PUCCH resource value configured by the higher layers |
| '11' | The 4th PUCCH resource value configured by the higher layers |

Note:
($n^{(1)}_{PUCCH,j}$, $n^{(1)}_{PUCCH,j+1}$) are determined from the first and second PUCCH resource list configured by higher layers, respectively.

Table 9 illustrates a mapping table of a transport block for selecting a PUCCH format 1b HARQ-ACK channel and HARQ-ACK(j) of a serving cell.

TABLE 9

| | | HARQ-ACK(j) | | |
|---|---|---|---|---|
| A | HARQ-ACK(0) | HARQ-ACK(1) | HARQ-ACK(2) | HARQ-ACK(3) |
| 2 | TB1 Pcell | TB1 Scell | NA | NA |
| 3 | TB1 serving cell1 | TB2 serving cell1 | TB1 serving cell2 | NA |
| 4 | TB1 Pcell | TB2 Pcell | TB1 Scell | TB2 Scell |

Figure 19:
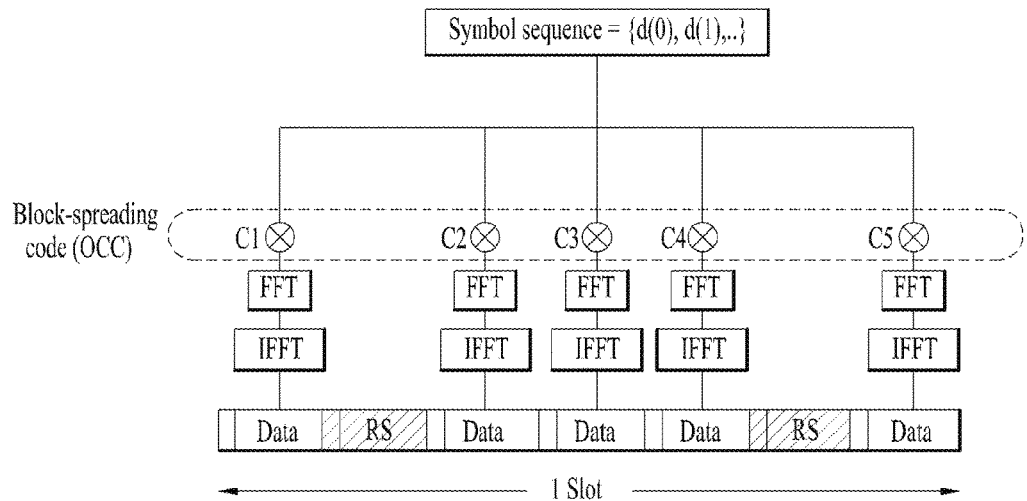
FIG. 19 illustrates a PUCCH format based on block spreading.

FIG. 19 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted to an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 19 as an example, one symbol sequence is spread by a length-5 (i.e. SF=5) OCC and then mapped to 5 SC-FDMA symbols. Although a total of 2 RS symbols is used during one slot in FIG. 19, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 19, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as a "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

For FDD with PUCCH format 3, the UE shall use PUCCH resource $n^{(3,\tilde{p})}_{PUCCH}$ or $n^{(1,\tilde{p})}_{PUCCH}$ for transmission of HARQ-ACK in subframe n for p~ mapped to antenna port p where for a PDSCH transmission only on the primary cell indicated by the detection of a corresponding PDCCH in subframe n−4, or for a PDCCH indicating downlink SPS release in subframe n−4 on the primary cell, the UE shall use PUCCH format 1a/1b and PUCCH resource $n^{(1,\tilde{p})}_{PUCCH}$ with $n^{(1,\tilde{p}0)}_{PUCCH}=n_{CCE}+N^{(1)}_{PUCCH}$ for antenna port $P_0$, where $n_{CCE}$ is the number of the first CCE (i.e. lowest CCE index used to construct the PDCCH) used for transmission of the corresponding PDCCH and $N^{(1)}_{PUCCH}$ is configured by higher layers. When two antenna port transmission is configured for PUCCH format 1a/1b, the PUCCH resource for antenna port $p_1$ is given by $n^{(1,\tilde{p}1)}_{PUCCH}=n_{CCE}+1+N^{(1)}_{PUCCH}$.

for a PDSCH transmission only on the primary cell where there is not a corresponding PDCCH detected in subframe n−4, the UE shall use PUCCH format 1a/1b and PUCCH resource $n^{(1,\tilde{p})}_{PUCCH}$ where the value of $n^{(1,\tilde{p})}_{PUCCH}$ is determined according to higher layer configuration and Table 7. For a UE configured for two antenna port transmission for PUCCH format 1a/1b, a PUCCH resource value in Table 7 maps to two PUCCH resources with the first PUCCH resource $n^{(1,\tilde{p}0)}_{PUCCH}$ for antenna port $p_0$ and the second PUCCH resource $n^{(1,\tilde{p}1)}_{PUCCH}$ for antenna port $p_1$, otherwise, the PUCCH resource value maps to a single PUCCH resource $n^{(1,\tilde{p}0)}_{PUCCH}$ for antenna port $p_0$.

for a PDSCH transmission on the secondary cell indicated by the detection of a corresponding PDCCH in subframe n−4, the UE shall use PUCCH format 3 and PUCCH resource $n^{(3,\tilde{p})}_{PUCCH}$ where the value of $n^{(3,\tilde{p})}_{PUCCH}$ is determined according to higher layer configuration and Table 10. The TPC field in the DCI format of the corresponding PDCCH shall be used to determine the PUCCH resource values from one of the four resource values configured by higher layers, with the mapping defined in Table 10. For a UE configured for two antenna port transmission for PUCCH format 3, a PUCCH resource value in Table 10 maps to two PUCCH resources with the first PUCCH resource $n^{(3,\tilde{p}0)}_{PUCCH}$ for antenna port $p_0$ and the second PUCCH resource $n^{(3,\tilde{p}1)}_{PUCCH}$ for antenna port $p_1$, otherwise, the PUCCH resource value maps to a single PUCCH resource $n^{(3,\tilde{p}0)}_{PUCCH}$ for antenna port $p_0$. A UE shall assume that the same HARQ-ACK PUCCH resource value is transmitted in each DCI format of the corresponding secondary cell PDCCH assignments in a given subframe.

TABLE 10

PUCCH resource value for HARQ-ACK resource for PUCCH

| Value of 'TPC command for PUCCH' | $n^{(3,\tilde{p})}_{PUCCH}$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

Hereinafter, embodiments of HARQ-ACK feedback according to the present invention will be described.

(1) Method 1: An FDD Based HARQ-ACK Timing is Applied to a Ucell

Figure 20:
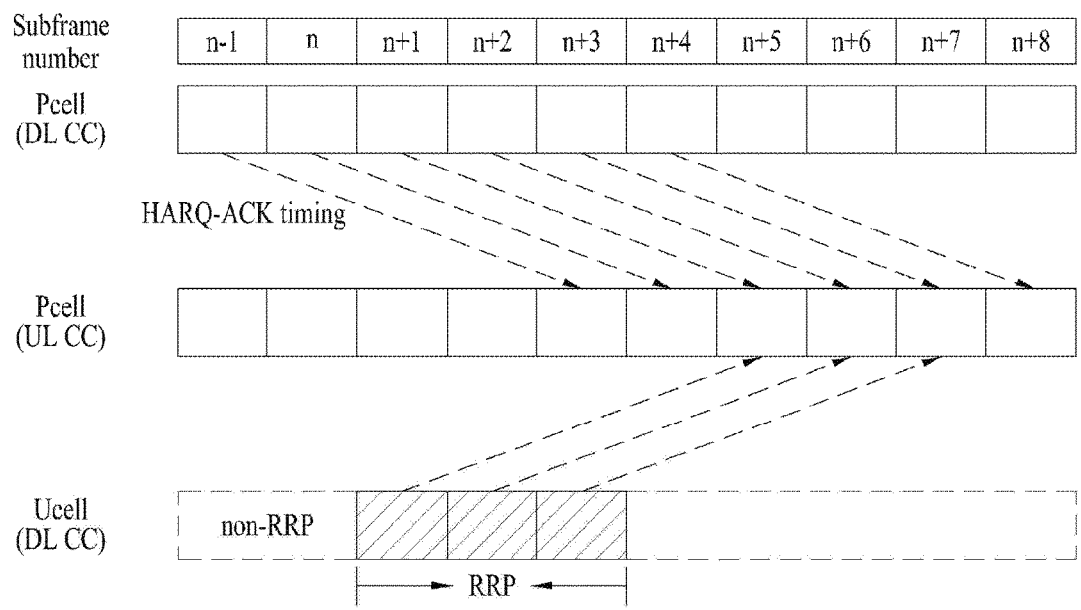
FIG. 20 illustrates HARQ-ACK transmission according to an embodiment of the present invention.

FIG. 20 illustrates HARQ-ACK transmission according to an embodiment of the present invention.

Referring to FIG. 20, a UE and/or an eNB may regard a Ucell to be the same as an FDD Scell (in terms of a DL HARQ operation) so that an FDD HARQ-ACK timing may be applied to HARQ-ACK transmission for DL data reception on the Ucell. Therefore, PF3 and CHsel schemes applied to a CA situation between an FDD Pcell and an FDD Scell may be configured for HARQ-ACK feedback. In addition, a multi-SF scheduling scheme may be applied to an RRP on the Ucell.

Upon considering the case in which a HARQ-ACK feedback scheme is configured as PF3 when the multi-SF scheduling scheme is applied to the RRP on the Ucell, an ACK/NACK resource indicator (ARI) (for designating one of a plurality of PF3 resources allocated through RRC) signaled through one DL grant DCI may be identically applied to a plurality of HARQ-ACK transmission UL subframes corresponding to a plurality of DL subframes scheduled from the corresponding DCI. That is, one PF3 resource corresponding to the ARI may be identically designated as a HARQ-ACK transmission resource in a plurality of UL subframes.

In the same situation, upon considering the case in which the CHsel scheme and self-CC scheduling are configured, an ARI (for designating one of a plurality of PUCCH format 1b (hereinafter, PF1) resources (sets) allocated through RRC) signaled through one DL grant DCI may be identically applied to a plurality of HARQ-ACK transmission UL subframes corresponding to a plurality of DL subframes scheduled from the corresponding DCI, similarly to the above case. That is, one PF1 resource (set) corresponding to the ARI may be identically designated as a PUCCH resource for CHsel in a plurality of UL subframes.

In the same situation, upon considering the case in which the CHsel scheme and cross-CC scheduling are configured, (a plurality of) PF1 resources (sets) for a HARQ-ACK resource corresponding to a Ucell may be allocated through RRC (even in a cross-CC scheduling situation) as opposed to a legacy single-SF scheduling based scheme. Therefore, an ARI for designating one of a plurality of PF1 resources (sets) may be signaled (in the form of borrowing a specific field (e.g. TPC)) to DL grant DCI for scheduling the Ucell (even in a cross-CC scheduling situation). In this case, an implicit PF1 resource linked to a corresponding DCI transmission resource (e.g. a specific (e.g. first and/or second) (E)CCE index constituting an (E)PDCCH) may be allocated to a DL subframe having the same subframe timing as a DCI transmission subframe among a plurality of DL subframes scheduled from one DL grant DCI. In addition, one explicit PF1 resource (set) corresponding to an ARI signaled through the corresponding DCI may be identically allocated to the other DL subframes as a PUCCH resource for CHsel.

The multi-SF scheduling scheme may be applied in the unit of each-RRP duration in a state in which one RRP duration is divided into a plurality of sub-RRP durations.

(2) Method 2: (Aggregated) HARQ-ACK is Configured for an RRP of a Ucell

Figure 21:
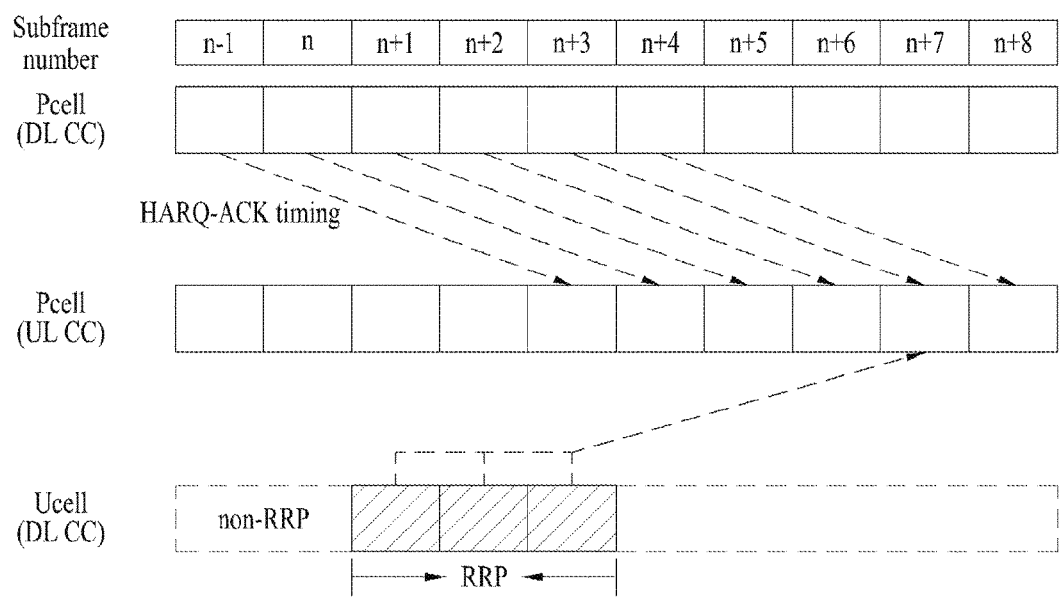
FIG. 21 illustrates HARQ-ACK transmission according to another embodiment of the present invention.

FIG. 21 illustrates HARQ-ACK transmission according to another embodiment of the present invention.

Referring to FIG. 21, as a method of aggregating a plurality of HARQ-ACK responses corresponding to one RRP (all DL subframes constituting the RRP) on a Ucell and simultaneously transmitting the HARQ-ACK responses through one UL subframe, the UL subframe may be configured as a UL subframe corresponding to the last subframe constituting the RRP (in terms of an FDD HARQ-ACK timing) and, in this case, only a PF3 scheme may be configured for HARQ-ACK feedback.

In this case, all ARIs signaled through DL grant DCI for scheduling DL subframes belonging to one RRP may be set to the same value and a plurality of HARQ-ACK responses corresponding to the Ucell (RRP) may be ordered according to a subframe time order. Alternatively, a downlink assignment indicator (DAI) indicating an order of DL data scheduled from the DCI may be signaled through the DL grant DCI for scheduling the RRP on the Ucell. In this case, the plural HARQ-ACK responses corresponding to the Ucell (RRP) may be ordered according to a DAI value order. In addition, a multi-SF scheduling scheme may be applied to the RRP on the Ucell.

Meanwhile, a single HARQ-ACK response (corresponding to one DL subframe) may be configured by applying time-bundling to the plural HARQ-ACK responses corresponding to one RRP (a plurality of DL subframes constituting the RRP) in the unit of each transport block (TB)/codeword (CW). That is, the single HARQ-ACK response (corresponding to one DL subframe) may be configured by applying a logical AND operation to all ACK/NACK responses corresponding to respective DL subframes with respect to the plural HARQ-ACK responses corresponding to one RRP (a plurality of DL subframes constituting the RRP). In this case, both PF3 and CHsel schemes applied to a CA situation between an FDD Pcell and an FDD Scell may be configured. When such time-bundling is applied, a DAI indicating the total number of DL subframes through which DL data is scheduled/transmitted in the RRP may be signaled through the DL grant DCI for scheduling the RRP on the Ucell. In this case, all ARIs signaled through the DL grant DCI for scheduling DL subframes belonging to one RRP in both the PF3 and CHsel schemes may be set to the same value.

Meanwhile, upon considering the case in which the time-bundling based CHsel scheme is configured, (a plurality of) PF1 resources (sets) may be allocated through RRC for a HARQ-ACK resource corresponding to the Ucell, with respect to the case in which both single-SF scheduling and multi-SF scheduling are applied to the RRP on the Ucell (and with respect to a situation in which both self-CC scheduling and cross-CC scheduling are configured). Therefore, an ARI for designating one of the plural PF1 resources (sets) is signaled (in the form of borrowing a specific field (e.g. TPC)) through the DL grant DCI for scheduling the Ucell (with respect to both single-SF scheduling and multi-SF scheduling and both self-CC scheduling and cross-CC scheduling) and then a final PUCCH resource for the CHsel scheme may be allocated/configured.

<HARQ-ACK Feedback Configuration Corresponding to Ucell>

HARQ-ACK feedback for DL data reception on the Ucell may be configured/transmitted only in an RRP duration. That is, HARQ-ACK feedback may not be configured/transmitted in a duration other than the RRP duration. The length of the RRP duration may be configured/signaled for the UE through a higher layer signal (e.g. RRC scheduling) or an L1 signal. The L1 signal may be a PDCCH through a Pcell or a preamble through the Ucell. The UE may perform PDCCH monitoring for Ucell scheduling only in the RRP duration. That is, the UE may not perform PDCCH monitoring for the Ucell in a duration other than the RRP duration.

Therefore, when the PDCCH or the preamble indicating RRP duration configuration/signaling on the Ucell is detected, the UE may perform PDCCH monitoring for Ucell scheduling and/or configure/transmit HARQ-ACK feedback corresponding to the Ucell, only during the RRP duration indicated through the PDCCH/preamble. For example, the PDCCH may be detected on the Pcell and the preamble may be detected on the Ucell.

Meanwhile, when a plurality of HARQ-ACK feedback signals for DL data reception is transmitted through a PUCCH (e.g. PF3) and/or a PUSCH in a CA situation between a Ucell in an unlicensed band and a cell (i.e. Lcell) in a legacy licensed band, the present invention proposes an embodiment of HARQ-ACK feedback configured to map HARQ-ACK corresponding to the Lcell on an entire HARQ-ACK payload to a bit having a lower index than that corresponding to the Ucell. This is because performance for a most significant bit (MSB) part on the entire HARQ-ACK payload may be relatively better in terms of a coding (e.g. Reed Muller (RM) code) characteristic applied to HARQ-ACK and thus more stable transmission for HARQ-ACK feedback corresponding to the Lcell may be performed according to the proposal. As an equivalent embodiment to the present invention, an embodiment of HARQ-ACK feedback configured to map HARQ-ACK corresponding to the Ucell to a bit having a higher index than that corresponding to the Lcell is also proposed.

Similarly, even when a plurality of CSI (e.g. RI or CQI/PMI) feedback signals is simultaneously transmitted through the PUCCH and/or the PUSCH in a CA situation between the Ucell and the Lcell, a CSI payload may be configured such that CSI corresponding to the Lcell is mapped to a bit having a lower index than that corresponding to the Ucell, on the entire CSI payload. This scheme may be always applied regardless of protection priorities of CSI reporting types (and CSI process indexes) or may be applied only when priorities of the CSI reporting types (and/or the CSI process indexes) between cells are equal. As an embodiment equivalent to the present embodiment, the CSI payload may be configured to map CSI corresponding to the Ucell to a bit having a higher index than that corresponding to the Lcell.

More generally, in a situation in which a plurality of CSI feedback signals is simultaneously transmitted through the PUCCH and/or the PUSCH, when CSI reporting types of a plurality of CSI differ, the CSI payload may be configured to map CSI of a CSI reporting type having a high priority to a bit having a lower index on the entire CSI payload. When CSI reporting types are equal, the CSI payload may be configured to map CSI of a CSI process index having a high priority to a bit having a low index on the entire CSI payload and, when CSI reporting types are equal and CSI process indexes are equal, the CSI payload may be configured to map CSI of a cell index having a high priority to a bit having a low index on the entire CSI payload.

Meanwhile, when periodic CSI feedback transmissions for a plurality of different cells collide at the same timing in a legacy CA situation:

1) only one CSI having the highest priority (if there is a plurality of CSI having the highest CSI reporting type priority, only one CSI having the lowest CSI process index) may be transmitted according to protection priorities of predefined CSI reporting types (e.g. PUCCH reporting type 3/5/6/2a>2/2b/2c/4>1/1a) and all the other CSI may be dropped or 2) if there is a plurality of CSI having the highest priority even after the above process is performed, only one CSI for a cell having the lowest cell index (e.g. ServCellIndex) may be transmitted and the other CSI may be dropped. In this case, the serving cell index (ServCellIndex) is a short identity used to identify a serving cell. For example, any one of integers from 0 to 'maximum number of carrier frequencies capable of being simultaneously configured for a UE−1' may be allocated to one serving cell as the serving cell index. That is, the serving cell index may be a logical index used to identify a specific serving cell among cells allocated to the UE, rather than a physical index used to identify a specific carrier frequency among all carrier frequencies.

When CSI feedback timings for the Ucell and the Lcell collide, it is proposed that a higher priority always be assigned to CSI for the Lcell regardless of protection priorities of CSI reporting types (and priorities of CSI process indexes). As another method, when CSI feedback timings of the Ucell and the Lcell overlap and protection priorities of the CSI reporting types are equal (and/or priorities of the CSI process indexes are equal), it is proposed that a higher priority be assigned to CSI for the Lcell.

The embodiments of HARQ-ACK feedback according to the present invention may be applied in the unit of each sub-RRP duration in a state in which one RRP duration is divided into a plurality of sub-RRP durations and, in this case, multi-SF scheduling and/or ACK/NACK time-bundling may also be applied in the unit of each sub-RRP duration.

Upon considering the case in which multi-SF scheduling is applied in the unit of an RRP or a sub-RRP duration when self-CC scheduling is configured with respect to the Ucell, a PDCCH (and/or a PCFICH and/or a PHICH) transmission resource region may be configured only in the first subframe in each RRP or sub-RRP duration and the PDCCH (and/or PCFICH and/or PHICH) transmission resource region may not be configured in subframes other than the first subframe. Therefore, a PDSCH transmission start symbol index on the Ucell may be determined/configured as a different value with respect to the first subframe and each of the other subframes (e.g. as a symbol index after the PDCCH transmission resource region in the case of the first subframe and as the first symbol index in the case of the other subframes) in each RRP or sub-RRP duration. In addition, a CRS for demodulating/detecting the PDCCH may be transmitted through all symbol durations or only through partial symbol durations (corresponding to, for example, the PDCCH transmission resource region) in the first subframe of each RRP or sub-RRP and the CRS may not be transmitted in subframes other than the first subframe.

Figure 22:
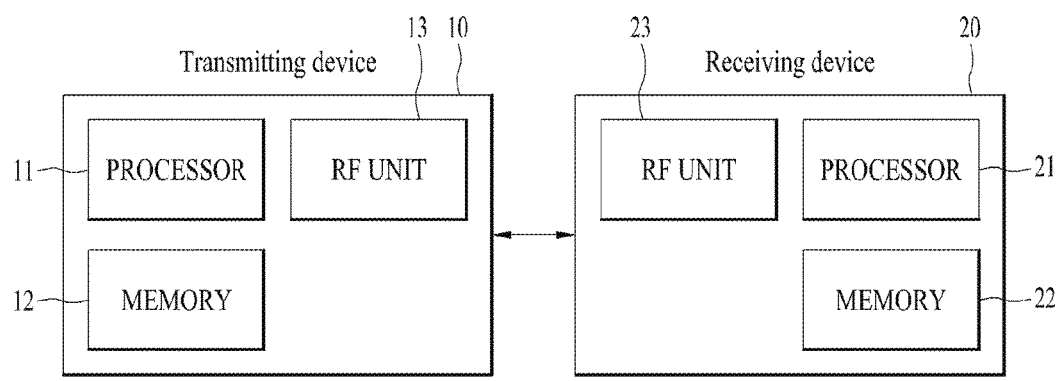
FIG. 22 is a block diagram illustrating elements of a transmitting device 10 and a receiving device 20 for implementing the present invention.

FIG. 22 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may control the eNB RF unit to transmit a PDCCH for a specific cell among a plurality of carrier-aggregated cells on any one of the plural cells according to any one of the above-described scheduling embodiments. The eNB processor may control the eNB RF unit to transmit, on a first cell of the plural cells, a PDCCH carrying a DL grant (hereinafter, a DL grant PDCCH) including resource allocation information of a PDSCH to be transmitted on the specific cell and control the eNB RF unit to transmit, on a second cell different from the first cell, a PDCCH carrying a UL grant (hereinafter, a UL grant PDCCH) including resource allocation information of a PUSCH to be transmitted on the specific cell. The eNB processor may control the eNB processor to transmit the PDSCH on the specific cell according to DCI carried by the DL grant PDCCH. In addition, the eNB processor may control the eNB RF unit to receive the PUSCH transmitted by the UE according to DCI carried by the UL grant PDCCH.

The UE processor may monitor PDCCHs on the plural cells by attempting to decode signals received by the UE RF unit on the plural cells. The DL grant PDCCH may be received or detected on the first cell and the UL grant PDCCH may be received or detected on the second cell different from the first cell. The UE processor may control the UE RF unit to receive the PDSCH on the specific cell according to the DCI carried by the detected DL grant PDCCH. In addition, the UE processor may control the UE RF unit to transmit the PUSCH on the specific cell according to the DCI carried by the detected UL grant PDCCH.

Based on a result of monitoring the PDCCHs or receiving the PDSCH, the UE processor of the present invention may configure HARQ-ACK according to any one of the above-described HARQ-ACK feedback embodiments. The UE processor may control the UE RF unit to transmit the HARQ-ACK at a PUCCH transmission timing according to any one of the above-described HARQ-ACK feedback embodiments using a PUCCH resource determined according to any one of the above-described HARQ-ACK feedback embodiments. The eNB processor may control the eNB RF unit to receive the HARQ-ACK at the PUCCH transmission timing according to any one of the above-described HARQ-ACK feedback embodiments using the PUCCH resource determined according to any one of the above-described HARQ-ACK feedback embodiments. The eNB processor may identify an ACK/NACK state for a DL reception signal received by the UE based on HARQ-ACK information received according to any one of the above-described HARQ-ACK feedback embodiments of the present invention. The eNB processor may control the eNB RF unit to perform initial transmission or retransmission to the UE based on the HARQ-ACK information.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method of receiving downlink control information by a user equipment (UE), the method comprising:

receiving, by the UE, first downlink control information for a first physical downlink shared channel (PDSCH) allocated to an unlicensed cell;
receiving, by the UE, downlink data through the first PDSCH on the unlicensed cell based on the first downlink control information;
receiving, by the UE, second downlink control information for a first physical uplink shared channel (PUSCH) allocated to the unlicensed cell; and
transmitting, by the UE, uplink data through the first PUSCH on the unlicensed cell based on the second downlink control information,
wherein the UE is configured with a plurality of cells,
wherein the plurality of cells include the unlicensed cell and a licensed cell,
wherein the unlicensed cell operates in an unlicensed spectrum, and the licensed cell operates in a licensed spectrum,
wherein the first downlink control information is received through a first cell which is configured as a downlink scheduling cell for the unlicensed cell among the plurality of cells, and
wherein the second downlink control information is received through a second cell which is configured as an uplink scheduling cell for the unlicensed cell among the plurality of cells.

2. The method according to claim 1,
wherein the unlicensed cell is not configured as a scheduling cell for the plurality of cells except the unlicensed cell.

3. The method according to claim 1, further comprising:
receiving, by the UE, third downlink control information for a second PDSCH allocated to the licensed cell; and
receiving, by the UE, fourth downlink control information for a second PUSCH allocated to the licensed cell,
wherein the third downlink control information and the fourth downlink control information are received through a third cell which is configured as a scheduling cell for the licensed cell among the plurality of cells.

4. The method according to claim 3,
wherein the plurality of cells comprise one or more unlicensed cells including the unlicensed cell and one or more licensed cells including the licensed cell, and
wherein the scheduling cell for the licensed cell is none of the one or more unlicensed cells, but is one of the one or more licensed cells.

5. The method according to claim 1,
wherein each of the downlink scheduling cell and the uplink scheduling cell for the unlicensed cell is one of the plurality of cells other than another unlicensed cell among the plurality of cells.

6. A method of transmitting downlink control information by a base station (BS), the method comprising:
transmitting, to a user equipment (UE), first downlink control information for a first physical downlink shared channel (PDSCH) allocated to an unlicensed cell;
transmitting, to the UE, downlink data through the first PDSCH on the unlicensed cell based on the first downlink control information;
transmitting, to the UE, second downlink control information for a first physical uplink shared channel (PUSCH) allocated to the unlicensed cell; and
receiving, from the UE, uplink data through the first PUSCH on the unlicensed cell based on the second downlink control information,
wherein the first downlink control information is transmitted through a first cell which is configured as a downlink scheduling cell for the unlicensed cell among a plurality of cells for the UE, wherein the plurality of cells include the unlicensed cell operating in an unlicensed spectrum and a licensed cell operating in a licensed spectrum, and
wherein the second downlink control information is transmitted through a second cell which is configured as an uplink scheduling cell for the unlicensed cell among the plurality of cells.

7. The method according to claim 6,
wherein transmitting the downlink data through the first PDSCH on the unlicensed cell comprises transmitting the downlink data through the first PDSCH after sensing that the unlicensed cell is idle.

8. The method according to claim 6,
wherein the unlicensed cell is not configured as a scheduling cell for the plurality of cells except the unlicensed cell.

9. The method according to claim 6, further comprising:
transmitting, by the BS, third downlink control information for a second PDSCH allocated to the licensed cell; and
transmitting, by the BS, fourth downlink control information for a second PUSCH allocated to the licensed cell,
wherein the third downlink control information and the fourth downlink control information are transmitted through a scheduling cell for the licensed cell among the plurality of cells.

10. The method according to claim 9,
wherein the plurality of cells comprise one or more unlicensed cells including the unlicensed cell and one or more licensed cells including the licensed cell, and
wherein the scheduling cell for the licensed cell is none of the one or more unlicensed cells, but is one of the one or more licensed cells.

11. The method according to claim 6,
wherein each of the downlink scheduling cell and the uplink scheduling cell for the unlicensed cell is one of the plurality of cells other than another unlicensed cell among the plurality of cells.

12. A user equipment (UE) for receiving downlink control information, the UE comprising:
a transceiver, and
a processor configured to control the transceiver, the processor configured to:
control the transceiver to receive first downlink control information for a first physical downlink shared channel (PDSCH) allocated to an unlicensed cell;
control the transceiver to receive downlink data through the first PDSCH on the unlicensed cell based on the first downlink control information;
control the transceiver to receive second downlink control information for a first physical uplink shared channel (PUSCH) allocated to the unlicensed cell; and
control the transceiver to transmit uplink data through the first PUSCH on the unlicensed cell based on the second downlink control information,
wherein the UE is configured with a plurality of cells,
wherein the plurality of cells include the unlicensed cell and a licensed cell,
wherein the unlicensed cell operates in an unlicensed spectrum, and the licensed cell operates in a licensed spectrum,
wherein the processor is configured to control the transceiver to receive the first downlink control information through a first cell which is configured as a downlink scheduling cell for the unlicensed cell among the plurality of cells, and wherein the processor is configured to control the transceiver to receive the second downlink control information through a second cell which is configured as an uplink scheduling cell for the unlicensed cell among the plurality of cells.

13. The UE according to claim 12, wherein the unlicensed cell is not configured as a scheduling cell for the plurality of cells except the unlicensed cell.

14. The UE according to claim 12, wherein the processor is configured to:
  control the transceiver to receive third downlink control information for a second PDSCH allocated to the licensed cell; and
  control the transceiver to receive fourth downlink control information for a second PUSCH allocated to the licensed cell,
wherein the processor is configured to control the transceiver to receive the third downlink control information and the fourth downlink control information through a scheduling cell for the licensed cell among the plurality of cells.

15. The UE according to claim 14, wherein the plurality of cells comprise one or more unlicensed cells including the unlicensed cell and one or more licensed cells including the licensed cell, and
wherein the scheduling cell for the licensed cell is none of the one or more unlicensed cells, but is one of the one or more licensed cells.

16. The UE according to claim 12, wherein each of the downlink scheduling cell and the uplink scheduling cell for the unlicensed cell is one of the plurality of cells other than another unlicensed cell among the plurality of cells.

17. A base station (BS) for transmitting downlink control information, the BS comprising:
  a transceiver, and
  a processor configured to control the transceiver, the processor configured to:
    control the transceiver to transmit first downlink control information for a first physical downlink shared channel (PDSCH) allocated to an unlicensed cell;
    control the transceiver to transmit downlink data through the first PDSCH on the unlicensed cell based on the first downlink control information;
    control the transceiver to transmit second downlink control information for a first physical uplink shared channel (PUSCH) allocated to the unlicensed cell; and
    control the transceiver to receive uplink data through the first PUSCH on the unlicensed cell based on the second downlink control information,
wherein the processor is configured to control the transceiver to transmit the first downlink control information through a first cell which is configured as a downlink scheduling cell for the unlicensed cell among the plurality of cells for the UE, wherein the plurality of cells include the unlicensed cell operating in an unlicensed spectrum and a licensed cell operating in a licensed spectrum, and
wherein the processor is configured to control the transceiver to transmit the second downlink control information through a second cell which is configured as an uplink scheduling cell for the unlicensed cell among the plurality of cells.

18. The BS according to claim 17, wherein the processor is configured to control the transceiver to transmit the first PDSCH on the unlicensed cell after sensing that the unlicensed cell is idle.

19. The BS according to claim 17, wherein the unlicensed cell is not configured as a scheduling cell for the plurality of cells except the unlicensed cell.

20. The BS according to claim 17, wherein the processor is configured to:
  control the transceiver to transmit third downlink control information for a second PDSCH allocated to the licensed cell; and
  control the transceiver to transmit fourth downlink control information for a second PUSCH allocated to the licensed cell,
wherein the processor is configured to control the transceiver to transmit the third downlink control information and the fourth downlink control information through a scheduling cell for the licensed cell among the plurality of cells.

21. The BS according to claim 20, wherein the plurality of cells comprise one or more unlicensed cells including the unlicensed cell and one or more licensed cells including the licensed cell, and
wherein the scheduling cell for the licensed cell is none of the one or more unlicensed cells, but is one of the one or more licensed cells.

22. The BS according to claim 17, wherein each of the downlink scheduling cell and the uplink scheduling cell for the unlicensed cell is one of the plurality of cells other than another unlicensed cell among the plurality of cells.

* * * * *